(12) United States Patent
Lastinger et al.

(10) Patent No.: US 7,305,246 B2
(45) Date of Patent: *Dec. 4, 2007

(54) METHOD AND APPARATUS FOR HIGH THROUGHPUT MULTIPLE RADIO SECTORIZED WIRELESS CELL

(75) Inventors: Roc Lastinger, Cave Creek, AZ (US); John Spenik, Phoenix, AZ (US); Brian C Woodbury, Gilbert, AZ (US)

(73) Assignee: Rotani, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/160,551

(22) Filed: Jun. 28, 2005

(65) Prior Publication Data

US 2005/0282545 A1    Dec. 22, 2005

Related U.S. Application Data

(62) Division of application No. 10/869,201, filed on Jun. 15, 2004.

(60) Provisional application No. 60/484,800, filed on Jul. 3, 2003, provisional application No. 60/493,663, filed on Aug. 8, 2003.

(51) Int. Cl.
*H04Q 7/20* (2006.01)

(52) U.S. Cl. ............... 455/466; 455/562.1; 455/419; 455/447; 455/452.1; 370/328; 370/330

(58) Field of Classification Search ............... 455/434, 455/466, 562.1, 419, 452.1, 447; 370/330, 370/328
See application file for complete search history.

(56) References Cited

U.S. PATENT DOCUMENTS

| | | | |
|---|---|---|---|
| 4,144,496 A | * | 3/1979 | Cunningham et al. ...... 455/447 |
| 5,161,249 A | * | 11/1992 | Meche et al. ............... 455/436 |
| 5,771,449 A | | 6/1998 | Blasing |
| 6,047,175 A | * | 4/2000 | Trompower ............. 455/452.1 |
| 6,104,935 A | | 8/2000 | Smith et al. |
| 6,229,486 B1 | | 5/2001 | Krile |
| 6,272,337 B1 | | 8/2001 | Mount et al. |
| 6,278,723 B1 | | 8/2001 | Meihofer |
| 6,304,762 B1 | | 10/2001 | Myers et al. |
| 6,388,999 B1 | * | 5/2002 | Gorsuch et al. ............ 370/335 |
| 6,400,955 B1 | | 6/2002 | Kawabata |
| 6,405,058 B2 | | 6/2002 | Bobier |

(Continued)

*Primary Examiner*—Joseph Feild
*Assistant Examiner*—Pierre-Louis Desir
(74) *Attorney, Agent, or Firm*—Lawrence Letham; Letham Law Firm LLC

(57) ABSTRACT

Methods and apparatus for high throughput wireless cells, capable of functioning as access points, are described. The wireless cells may be equipped with multiple radios to increase the amount of throughput available through a single wireless cell. Multiple antennas attached to the radios through RF switches may enable the wireless cell to service multiple clients simultaneously. The physical sectors of the antennas may overlapped to form virtual sectors that provide greater flexibility in client load management and in simultaneously servicing multiple clients. Attenuators may reduce interference from foreign wireless cells or clients. Systems and methods for assigning minimally interfering channels to either physical sectors or to radios to reduce interference between adjacent sectors and overlapping sectors are also disclosed. An antenna horn may also allow any antenna to be used as a directional antenna and may enable the antenna's angle of coverage to be adjusted. The use of multiple antennas on a client to reduce interferences is also described.

15 Claims, 21 Drawing Sheets

U.S. PATENT DOCUMENTS

| | | |
|---|---|---|
| 6,421,542 B1 | 7/2002 | Sandler et al. |
| 6,463,301 B1 | 10/2002 | Bevan |
| 6,470,195 B1 | 10/2002 | Meyer |
| 6,486,832 B1 | 11/2002 | Abramov |
| 6,505,045 B1 | 1/2003 | Hills |
| 6,531,985 B1 | 3/2003 | Jones |
| 6,560,443 B1 | 5/2003 | Vaisanen |
| 6,690,657 B1 | 2/2004 | Lau |
| 2001/0046866 A1 | 11/2001 | Wang |
| 2002/0019233 A1 | 2/2002 | Leung |
| 2002/0077152 A1 | 6/2002 | Johnson et al. |
| 2002/0197984 A1 | 12/2002 | Monin et al. |
| 2003/0002442 A1 | 1/2003 | Flammer |
| 2003/0087645 A1 | 5/2003 | Kim |
| 2003/0109285 A1 | 6/2003 | Reed |
| 2003/0125089 A1 | 7/2003 | Pedersen |
| 2003/0181180 A1 | 9/2003 | Darabi |
| 2003/0210665 A1* | 11/2003 | Salmenkaita et al. ....... 370/330 |
| 2004/0009791 A1 | 1/2004 | Hiramatsu |
| 2004/0106412 A1 | 6/2004 | Laroia et al. |
| 2004/0196834 A1 | 10/2004 | Ofek et al. |

* cited by examiner

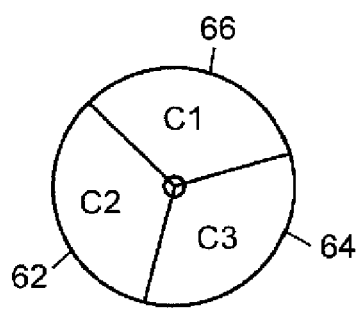
FIG. 40
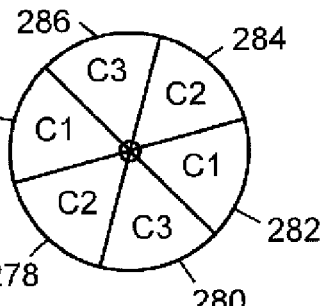
FIG. 42
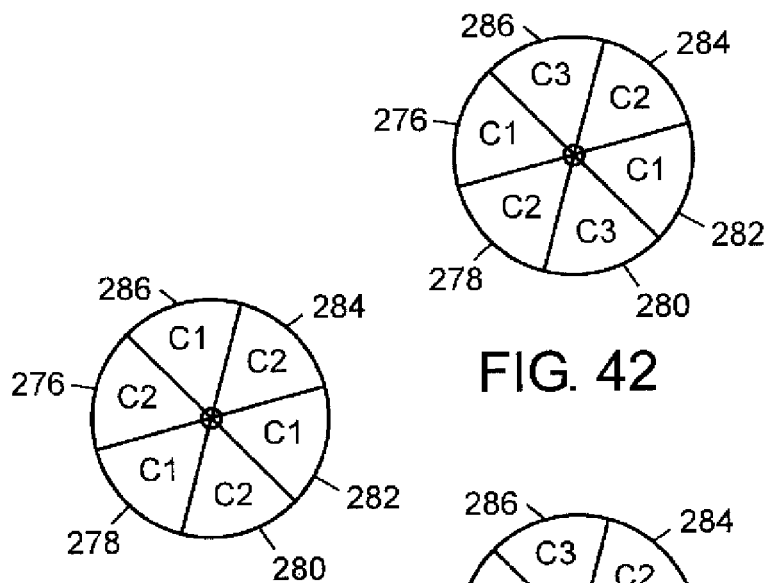
FIG. 41
FIG. 43
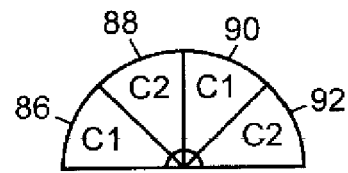
FIG. 44
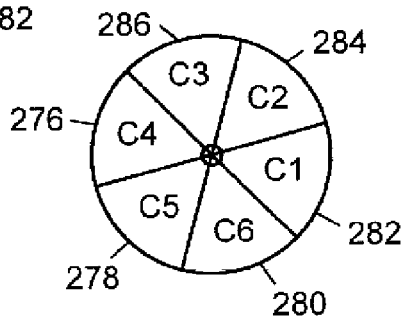
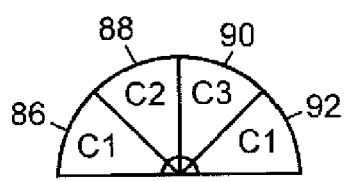
FIG. 45
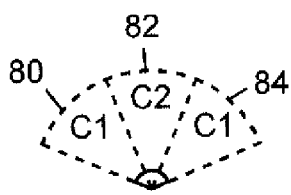
FIG. 47
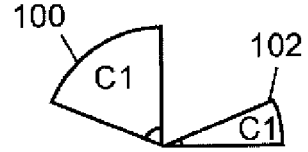
FIG. 49
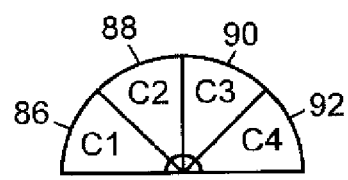
FIG. 46
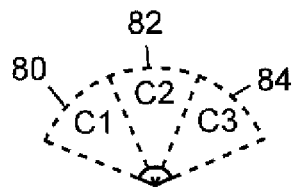
FIG. 48
FIG. 50

METHOD AND APPARATUS FOR HIGH THROUGHPUT MULTIPLE RADIO SECTORIZED WIRELESS CELL

CROSS-REFERENCE TO RELATED APPLICATIONS

This application is a divisional of and claims priority to, and the benefit of, U.S. patent application Ser. No. 10/869,201, filed Jun. 15, 2004, which is hereby incorporated by reference in its entirety. This application also claims priority to, and the benefit of, U.S. provisional application Ser. No. 60/484,800 filed on Jul. 3, 2003, which is also hereby incorporated by reference in its entirety, and to U.S. provisional application Ser. No. 60/493,663 filed on Aug. 8, 2003, which is also hereby incorporated by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

FIELD OF INVENTION

This invention generally relates to wireless communications, and more particularly, to systems and methods for wireless cells, access points, and clients.

BACKGROUND OF INVENTION

Many systems incorporate the IEEE 802.11 protocols, channels, and encoding to create wireless access points and clients capable of communicating with each other regardless of the manufacturer of the device. As such, the popularity of wireless access and connectivity has increased demand for wireless throughput. However, the current generation of wireless access points and devices are limited in that they use omni-directional antennas assigned to a single channel. The demand for wireless access has increased the demand for higher wireless throughput per wireless access point, the reduction of interference between wireless cells, and the ability to use off-the-self components to deliver higher performance at lower cost.

SUMMARY OF INVENTION

The invention overcomes the limitations and problems of the prior art by providing an improved wireless cell that wirelessly communicates with other apparatus. In one embodiment, the enhanced antenna system includes at least one of sectorized coverage, attenuation, overlapping or non-overlapping antenna physical sector arrangements, and minimally interfering radio channels to enable multiple antennas and multiple radios to substantially simultaneously operate in a single wireless cell and to provide increased throughput, while minimizing the interference with foreign wireless systems.

In another embodiment, a horn may also enable any antenna type to function as a directional antenna and to provide either overlapping or non-overlapping antenna physical sector arrangements, while at least one of reducing interference from behind the antenna, interference between adjacent antennas, and multi-path interference. The invention may also include inexpensive, off-the-shelf radios with diversity switches to automatically select between directional antennas used in an enhanced antenna system where the physical sectors of the two antennas connected to a single radio may be oriented about 180 degrees opposed to each other. The enhanced antenna system may also be used on apparatus that function as clients to a wireless cell.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

FIG. 40 is a diagram of an exemplary channel assignment using three channels for three, adjacent, non-overlapping physical sectors providing about 360-degree coverage.

FIG. 41 is a diagram of an exemplary channel assignment using two channels for six, adjacent, non-overlapping physical sectors providing about 360-degree coverage.

FIG. 42 is a diagram of an exemplary channel assignment using three channels for six, adjacent, non-overlapping physical sectors providing about 360-degree coverage.

FIG. 43 is a diagram of an exemplary channel assignment using six channels for six, adjacent, non-overlapping physical sectors providing about 360-degree coverage.

FIG. 44 is a diagram of an exemplary channel assignment using two channels for four, adjacent, non-overlapping physical sectors providing about 180-degree coverage.

FIG. 45 is a diagram of an exemplary channel assignment using three channels for four, adjacent, non-overlapping physical sectors providing about 180-degree coverage.

FIG. 46 is a diagram of an exemplary channel assignment using four channels for four, adjacent, non-overlapping physical sectors providing about 180-degree coverage.

FIG. 47 is a diagram of an exemplary channel assignment using two channels for three, adjacent, non-overlapping physical sectors.

FIG. 48 is a diagram of an exemplary channel assignment using three channels for three, adjacent, non-overlapping physical sectors.

FIG. 49 is a diagram of an exemplary channel assignment using one channel for two, non-adjacent, non-overlapping physical sectors.

FIG. 50 is a diagram of an exemplary channel assignment using one channel for one physical sector.

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

As will be appreciated by one of ordinary skill in the art, the present invention may be embodied as a customization of an existing system, an add-on product, upgraded software, a stand alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Figure 1:
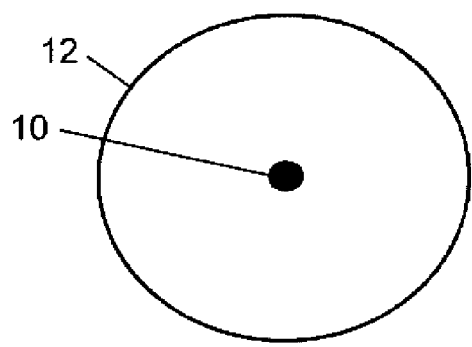
FIG. 1 is a diagram of an exemplary area of coverage of an omni-directional antenna.
Figure 2:
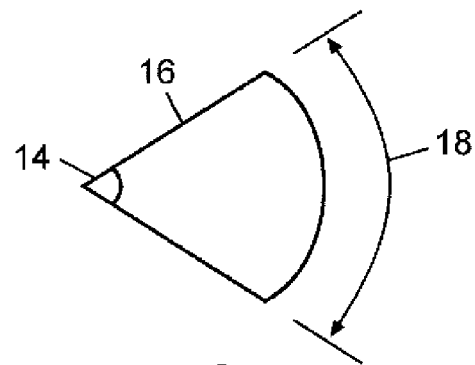
FIG. 2 is a diagram of an exemplary area of coverage, or physical sector, of a directional antenna.

An omni-directional antenna 10 sends and receives radio signals in substantially all directions. The ideal area of coverage 12, ignoring any null areas, of the omni-directional antenna 10 in FIG. 1 is substantially circular because it is shown on paper in two dimensions, but in reality, the ideal area of coverage of an omni-directional antenna is similar to a sphere. The ideal area of coverage 16, ignoring any back-lobes, of the directional antenna 14 in FIG. 2 is shown in two dimensions as a part of a circle; however, in reality, the ideal area of coverage of a directional antenna is an angular fraction of a sphere. The arc 18 indicates the angle of coverage of directional antenna 14 and area of coverage 16. The angle of coverage of a directional antenna ranges from a fraction more than 0 degrees to a fraction less than about 360 degrees. The operational center of directional antenna 14 is the center of its angular area of coverage. For example, the angle of coverage of antenna 14 is about 20 degrees, but its operational center is at about 10 degrees.

Figure 6:
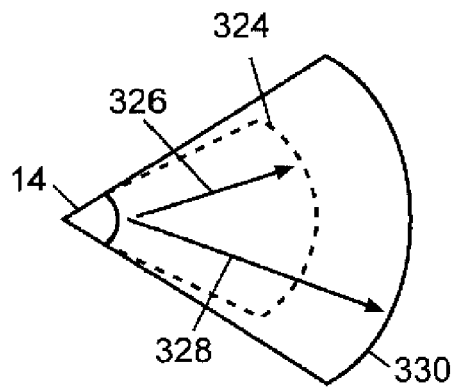
FIG. 6 is an exemplary diagram of optimal and absolute maximum coverage distance and areas.

The line depicting the antenna area of coverage does not necessarily indicate the maximum range of the radio attached to the antenna. For example, the circle labeled 12 in FIG. 1 does not necessarily mean that the radio attached to omni-directional antenna 10 cannot transmit farther than area of coverage 12. Circle 12 may depict the absolute transmission or reception limit, but it may also represent the distance at which most radio signals decrease to a predetermined signal strength while the maximum limits may extend beyond circle 12. The same concept applies to the area of coverage of a directional antenna; however, the angle of coverage 18 may not change appreciably. For example, the distance 328 from directional antenna 14 in FIG. 6 to the outer edge of area of coverage 330 represents the absolute maximum distance that a signal of detectable strength may be transmitted or received by the radio attached to antenna 14. The distance 326 and the dash area of coverage 324 represent the extent of usable signal strength coverage for reliable transmission. A client position inside area of coverage 324, without considering environmental anomalies, may receive the minimum usable radio signal strength. A client outside area of coverage 324, but inside area of coverage 330 may still be detected by antenna 14, but the client may receive signals with less than usable signal strength. Note that the angle of coverage does not change appreciably between optimal area of coverage 324 and absolute maximum area of coverage 330 because directional antennas attenuate signals at the edge of their angle of coverage.

Figure 21:
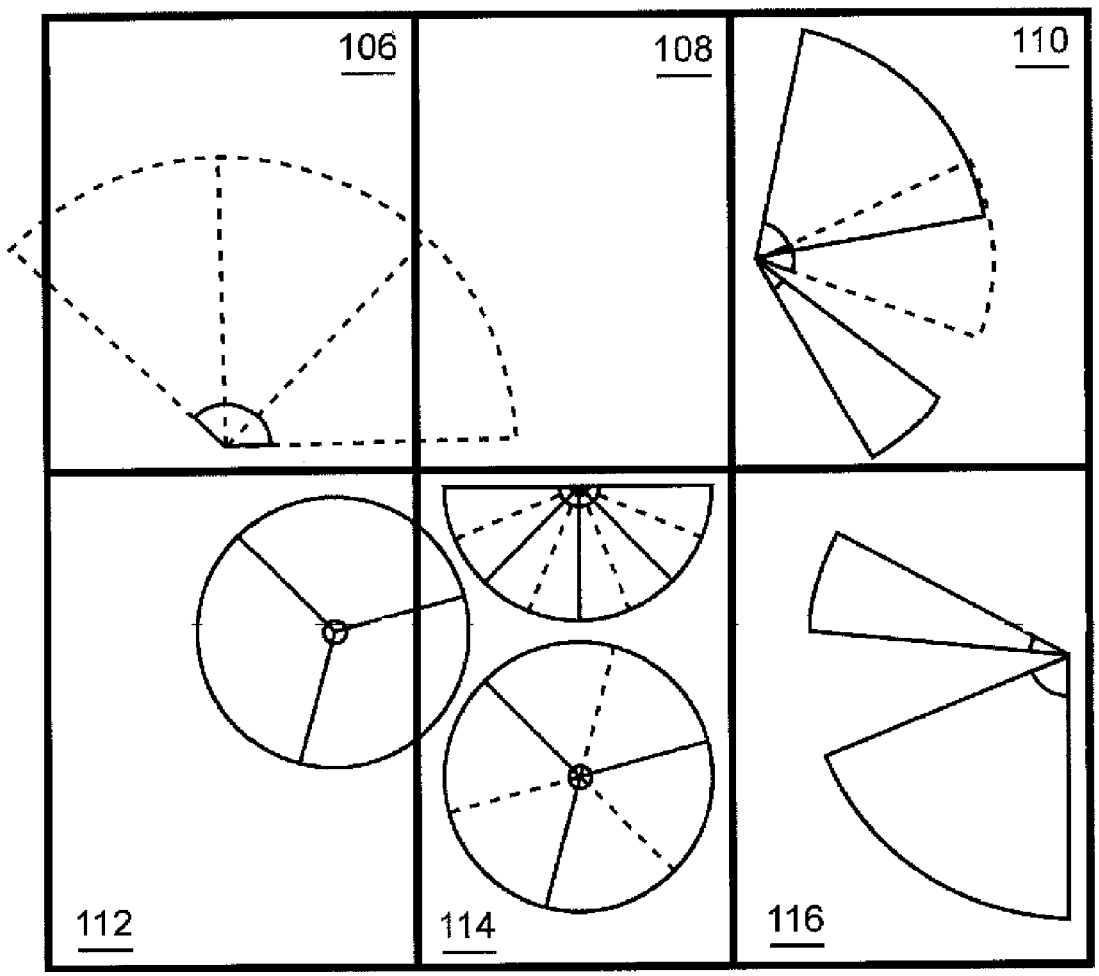
FIG. 21 is a diagram of exemplary wireless cells, or access points, in individual apartments.

In this application, any area of coverage drawn does not necessarily represent the maximum limits of transmission and reception 330, but rather, the area represents the usable signal level area of coverage 324. Therefore, two adjacent areas of coverage may interfere with each other to some extent even though their drawn areas of coverage are not shown to overlap. Referring to FIG. 21, the drawn areas of coverage of the directional antennas of room 112 do not overlap with the areas of coverage of the directional antennas of rooms 106 or 114; however, if the maximum extent of all the antennas were shown, they may interfere with each other.

Figure 3:
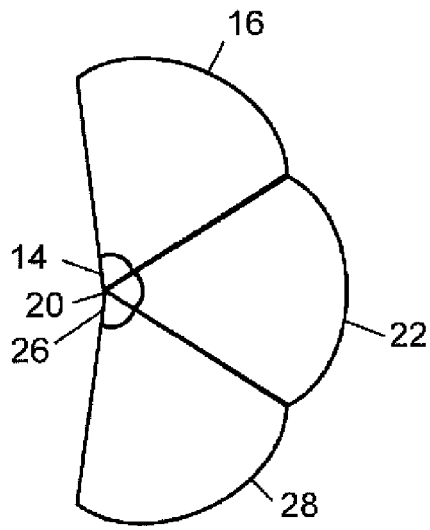
FIG. 3 is a diagram of three exemplary adjacent physical sectors.

The area of coverage 16 of directional antenna 14, shown in FIG. 2, is also referred to as a physical sector. Three adjacent physical sectors, 16, 22, and 28, of antennas 14, 20, and 26 are shown in FIG. 3. Because antennas 14, 20, and 26 are directional, the radio signals along their contiguous side may be attenuated. Therefore, adjacent physical sectors that use the same radio channel (frequency) may interfere with each other, but the amount of interference may be controlled, in one embodiment, through selecting directional antennas with high attenuation at the edges of their physical sector, by placing the directional antennas with extra angular spacing between them, or by using a horn as described below. Even though there is some interference between physical sectors 16 and 22, and 22 and 28, they are considered to be adjacent and non-overlapping because they are positioned so their angle of coverage does not overlap. For example, assume that each antenna 14, 20, and 26 has an angle of coverage of 20 degrees. If antennas 14, 20, and 26 are positioned so that their combined angle of coverage is 60 degrees (i.e., 20 degrees each), then they do not overlap.

Figure 4:
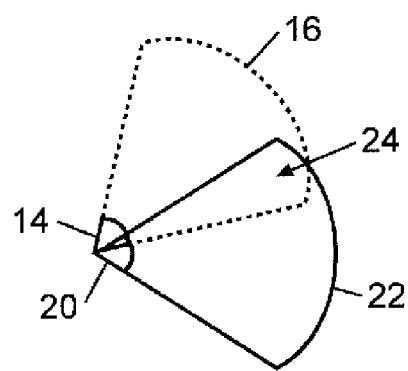
FIG. 4 is a diagram of two exemplary overlapping physical sectors forming an exemplary virtual sector.
Figure 5:
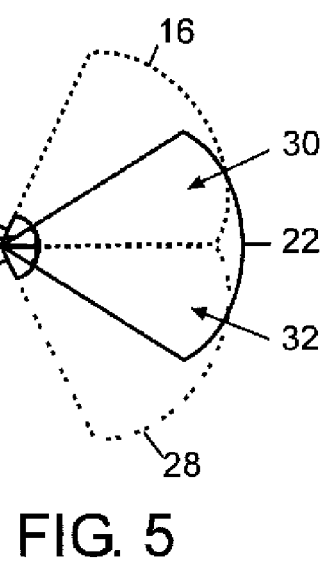
FIG. 5 is a diagram of two exemplary adjacent and one exemplary overlapping physical sectors forming two exemplary virtual sectors.

If antennas are placed so that their combined angle of coverage is less than the sum of their individual angle of coverage, as shown in FIG. 4, then the physical sectors overlap. The area of overlap of physical sectors 16 and 22 in FIG. 4 may be referred to as a virtual sector 24. The size of virtual sector 24 is the amount of overlap between physical sectors 16 and 22. Virtual sectors may range in size from a small fraction of a physical sector to the entire sector if the physical sectors completely overlap. Overlapping physical sectors do not need to be of similar size and the amount of overlap is not fixed. The physical sectors 16, 22, and 28 in FIG. 5 are all similar in size. Physical sector 16 overlaps half of physical sector 22 and forms virtual sector 30, which is about half the size of either physical sector 16 or 22. Physical sectors 22 and 28 also overlap by about half their angular width and form virtual sector 32. In other words, physical sector 22 overlaps 50% each of adjacent physical sectors 16 and 28. The area of coverage within a virtual sector may receive antenna, and therefore radio, coverage from more than one source. Virtual sectors 24 or 30 may receive coverage from antennas 14 and 20. Virtual sector 32 may receive coverage from antennas 20 and 26. If antennas 14 and 20 are attached to different radios, then the virtual sectors are serviced by two radios instead of the single radio that services either physical sector. There are no limits to how many physical sectors may overlap, which means that multiple antennas and multiple radios may service a virtual sector. The advantage of overlapping sectors will become apparent when enhanced antenna systems and wireless cells using enhanced antenna systems are described below.

Antennas may be connected to radios such that the radio may communicate with other apparatus. Depending on the protocol, most radios transmit and receive information through a channel or set of channels that may be associated in some way to radio frequencies. Two apparatus typically use the same channel in order to communicate. Communication occurs when two apparatus use the same channel to transmit to each other or receive from each other. If two apparatus simultaneously transmit on the same channel, the transmissions may interfere with each other and may be made unintelligible. Depending on the frequency of the channels and the apparatus configuration, two apparatus set to different channels may interfere with each other. However, some channels interfere only minimally with each other when transmitting in the same area simultaneously. Two radios using different, minimally interfering channels interfere with each other only minimally when simultaneously transmitting.

The 802.11 protocols provide minimally interfering channels that allow radios using different channels to operate simultaneously in the same physical area. Minimally interfering channels are advantageous when using overlapping or adjacent physical sectors. As discussed above, physical sectors 16 and 22 in FIG. 3 interfere with each other to some extent when they use the same channel because they are adjacent. Overlapping physical sectors, as shown in FIG. 4 and FIG. 5, may interfere with each other even more than adjacent physical sectors if each physical sector were assigned the same channel. However, the radios do not interfere with each other even though the physical sectors are adjacent or overlapping, if the radios attached to the antennas of adjacent or overlapping physical sectors use different minimally interfering channels. The assignment of channels to overlapping and adjacent physical sectors plays an important role in enabling multiple radios to operate simultaneously in the same or nearby physical space.

Figure 7:
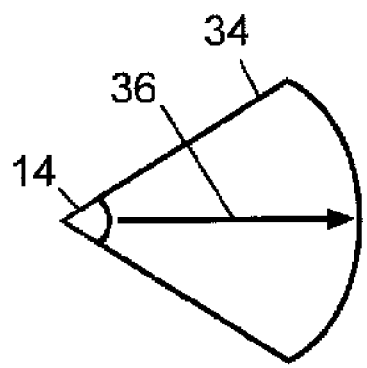
FIG. 7 is an exemplary diagram of the maximum transmit physical sector size when the radio is at maximum power.
Figure 8:
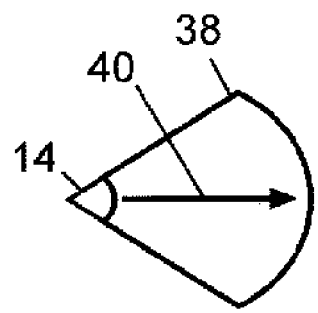
FIG. 8 is a diagram of an exemplary physical sector size when the radio is at less than maximum power.

For a given wireless cell, the area of coverage of an antenna and its associated radio (i.e., the size of the physical sector), is often tied to the power of its transmit signal and its sensitivity when receiving signals. An antenna, with its attached radio, has a greater area of coverage, and thereby a larger physical sector, if it transmits strong signals and detects weak signals. The radio, for the most part, may control the strength of the transmitted signal. Adjusting the transmit power of an off-the-self radio changes the area of coverage, or size, of the antenna's physical sector. The physical sector 34 and distance 36 shown in FIG. 7 represents the size of the physical sector when the radio transmits at maximum power. As radio transmission power decreases, physical sector size 38 and distance 40, as shown in FIG. 8, also decrease.

Figure 9:
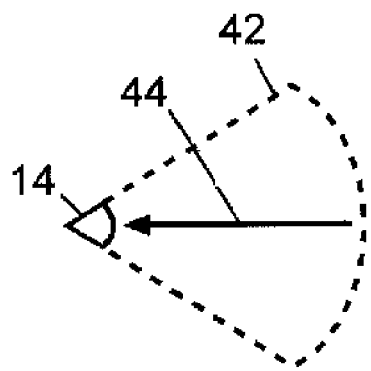
FIG. 9 is a diagram of an exemplary maximum receive physical sector size when the attenuator provides no attenuation.
Figure 10:
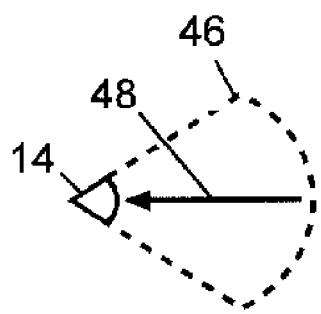
FIG. 10 is a diagram of an exemplary physical sector size when the attenuator attenuates.
Figure 11:
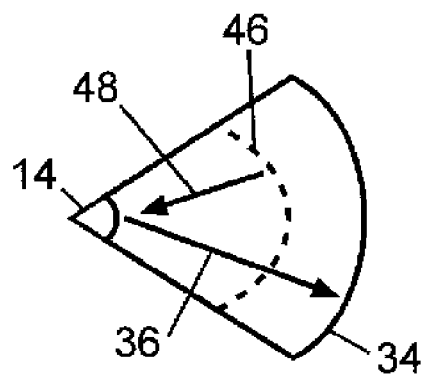
FIG. 11 is a diagram of an exemplary maximum transmit physical sector overlaid on a non-maximum receive physical sector.

The same variation in size occurs for receive signals if an attenuator is placed in the radio receive path. An attenuator with zero attenuation allows the maximum receive physical sector 42 and receive distance 44 as shown in FIG. 9. As the attenuation increases, the size of the receive physical sector 46 and receive distance 48 decrease as shown in FIG. 10. Clearly, the size of the transmit physical sector may also be adjusted by using an attenuator in the transmit path. In other embodiments, the size of the receive sector may be adjusted using variable gain. Both transmit and receive physical sector sizes may be simultaneously adjusted if an attenuator is placed between the radio and the antenna thereby affecting both the transmit and receive paths substantially equally. Obviously, the size of the transmit and receive physical sectors may be adjusted independently. FIG. 11 shows a maximum transmit physical sector 34 and a non-maximum receive physical sector 46. The utility of independently adjustable transmit and receive physical sector sizes becomes apparent when methods of dealing with noisy foreign clients are discussed; however, decreasing the size of the receive physical sector reduces the interference of noisy and unwanted sources. One of the main strategies is to reduce the size of the receive physical sector to the point that unwanted noise is reduced without cutting off communication with desirable clients, while at the same time transmitting a strong signal to all clients within the transmit physical sector. Attenuation may also be adjusted to provide optimal data throughput between a wireless cell and a client.

A wireless cell includes, for example, a collection of antennas, radios, and potentially other devices (e.g., attenuators, RF switches, etc.) under the common control of a processor or multiple processors. An exemplary wireless cell communicates with other wireless cells, wireless clients, or other wireless devices. One embodiment of a wireless cell is an access point, which combines wireless communication with an I/O port connected to a wired network thereby allowing communication between wired and wireless devices. For a given wireless cell, the cell's coverage, meaning the physical area serviced wirelessly, depends on the number, type, physical sector size, and arrangement of the antennas. The coverage of a wireless cell that uses an omni-directional antenna is ideally a sphere type shape as shown in two dimensions in FIG. 1. Directional antennas provide greater flexibility in providing wireless cell coverage.

Figure 12:
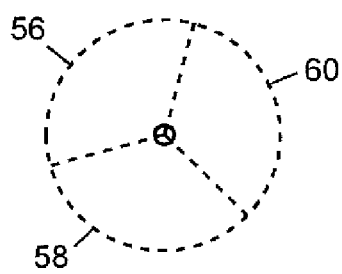
FIG. 12 is a diagram of three exemplary adjacent, non-overlapping physical sectors providing about 360-degree coverage.
Figure 13:
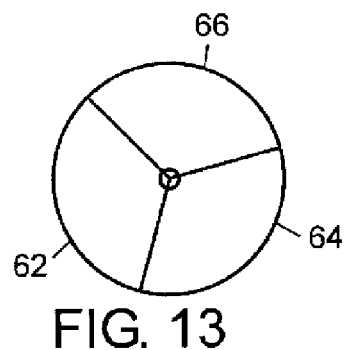
FIG. 13 is a diagram of three exemplary adjacent, non-overlapping physical sectors providing about 360-degree coverage with orientation different than physical sectors of FIG. 12.

The physical sectors from three, 120-degree, directional antennas combine to provide about 360-degree, non-overlapping wireless cell coverage as shown in FIG. 12 or FIG. 13. Note that the orientation of the antennas in FIG. 12 vary from the antennas of FIG. 13 by about 60 degrees. If the antennas from FIG. 12 were combined with the antennas of FIG. 13 into the same wireless cell while preserving their orientation, the wireless cell may have the coverage shown in FIG. 14. The wireless cell coverage of FIG. 14 has six overlapping physical sectors: 56, 58, 60, 62, 64, and 66. Each physical sector is similar size and overlaps about half of two adjacent physical sectors. For example, physical sector 60 overlaps about half of physical sector 66 and about half of physical sector 64. The overlap of sector 60, 64, and 66 form virtual sector 76 and 74. Each physical sector overlaps two adjacent, non-overlapping physical sectors to form six virtual sectors: 68, 70, 72, 74, 76, and 78. Each virtual sector includes about 60-degree angle of coverage.

Figure 14:
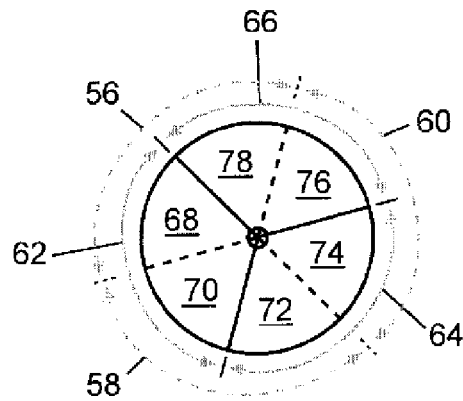
FIG. 14 is a diagram of six exemplary overlapping physical sectors forming six virtual sectors and providing about 360-degree coverage.

FIG. 14 shows physical sectors of substantially equal size, but, as mentioned earlier, the physical sectors are not limited to having substantially equal angle of coverage, nor do they need to be of substantially equal transmit or receive size. Additionally, in FIG. 14, each virtual sector is formed by the overlap of two physical sectors, but the number of physical sectors that overlap to form a virtual sector is not limited. Wireless cell coverage depends on the characteristics of the individual physical sectors and how they combine. There are no requirements or limitations on size or method of combination; however, when providing about 360-degree wireless cell coverage, one embodiment includes physical sectors of substantially equal sizes that substantially equally overlap two non-overlapping and adjacent sectors. Wireless cell coverage does not need to be only 360 degrees.

Figure 15:
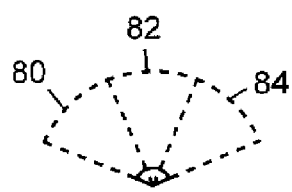
FIG. 15 is a diagram of three exemplary adjacent, non-overlapping physical sectors.
Figure 16:
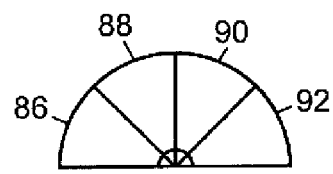
FIG. 16 is a diagram of four exemplary adjacent, non-overlapping physical sectors with orientation different than the physical sectors of FIG. 15.

The three, non-overlapping, adjacent, physical sectors of FIG. 15 provide wireless cell coverage that is less than about 180 degrees. Four non-overlapping, adjacent, physical sectors shown in FIG. 16 provide about 180-degree wireless cell coverage. The combination of the wireless cell coverage from FIG. 15 and FIG. 16 form the wireless cell coverage shown in FIG. 17. Note that physical sector 80 overlaps physical sectors 86 and 88 thereby forming two virtual sectors and physical sector 84 overlaps physical sectors 90 and 92 thereby also forming two virtual sectors. However, in the areas marked 94 and 96, there are no physical sector overlaps; therefore, they are not virtual sectors and have coverage by the single antennas 86 and 92, respectively. It may be possible to extend the angle of coverage of antenna 80 to overlap all of physical sector 86, thereby creating a virtual sector in almost all of physical sector 86 covered by physical sectors 80 and 86. The same may be done with physical sector 84 with respect to physical sector 92.

Figure 18:
FIG. 18 is a diagram of an exemplary physical sector of a single directional antenna.
Figure 19:
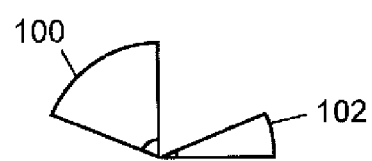
FIG. 19 is a diagram of two exemplary non-overlapping, non-adjacent physical sectors.
Figure 20:
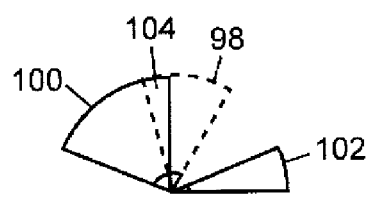
FIG. 20 is a diagram of three exemplary physical sectors wherein two physical sectors overlap and form a virtual sector.

FIG. 18 shows an exemplary coverage of a wireless cell based on a single directional antenna. The wireless cell coverage shown in FIG. 19 is formed by two, non-adjacent physical sectors of different sizes. The combination of the wireless cell areas of coverage of FIG. 18 and FIG. 19 into a single wireless cell results in the wireless cell coverage shown in FIG. 20. The overlap of physical sector 98 and 100 form virtual sector 104. As stated above, no requirements or limitations exist, but wireless cell coverage may depend on, for example, the number, type, physical sector size, and arrangement of the antennas forming the wireless cell.

Wireless cells may include related and unrelated (i.e., foreign) wireless cells. Wireless cells may be related if they have some level of common control. Generally, related wireless cells form a wireless network capable of, for example, routing between wireless cells, collectively assigning channels to avoid interference, and automatic physical sector size adjustment. Foreign wireless cells are independent wireless cells with no central method of control or method of peer-to-peer control. For example, imagine each rectangular box in FIG. 21 to be an apartment in a building. Apartments 106, 110, 112, 114, and 116 have each set up wireless cells. The wireless cells in different apartments are not related. They are foreign to each other. No substantial set up or control communications takes place between the wireless cells in different apartments and no common processor coordinates them. The wireless cells do not collectively decide which channel should be assigned to each physical sector to minimize interference between apartments. If a wireless cell in one apartment assigns channels that interfere with a wireless cell in another apartment, the wireless cells do not coordinate between themselves to reduce interference because they are foreign to each other.

An antenna-sharing device (ASD) enables two different radio signal sources to share the same antenna. The ASD 148 shown in FIG. 23 combines the transmit path 160 from radio 136 with the receive path 162 into a transmit/receive path connected to RF switch 130.

A client may be any type of wireless apparatus that communicates or cooperates with a wireless cell. A client may be distinguished from a wireless cell in that a client generally communicates only with a single wireless cell whereas a wireless cell communicates with many clients. However, the definition should not be limiting because one wireless cell may appear to be a client to another wireless cell. Another definition of a client is that a client either produces or consumes data, whereas wireless cells generally only transfer data between wired or wireless sources. Some information is produced and consumed by wireless cells, but usually the information is related to the control of communications between wireless cells, or between wireless cells and clients. In an 802.11 wireless system, a client is a device that associates with and uses the network services of access points.

No limitations are assumed for the clients disclosed in this application. Clients may have one or more radios and one or more antennas. A client may function as a slave to a wireless cell or the client may work in conjunction with the wireless cell by transmitting control information and requests to the wireless cell in addition to data. Control information from a client may include, for example, signal quality, desired antenna, error rate, number of dropped frames, desired throughput, throughput delivered, wireless cells detected, and/or any other conceivable information. Client requests may include, for example, retransmission, channel change, throughput demands, authentication, variation in transmit power, and/or a request to modify any communication factor.

Clients are not limited to communicating only with wireless cells. In the ad hoc mode, clients may communicate directly with each other without the central coordination of a wireless cell. The advanced clients described in this application are not limited to communicating with wireless cells. Advanced clients are also capable of operating in the ad hoc mode.

Advanced clients may communicate control information to a wireless cell. All clients may associate with a wireless cell and may send data to and receive data from a wireless cell, but advanced clients may send the wireless cell information that helps the wireless cell manage its communication with the clients it serves. An advanced client may inform the wireless cell, for example, of its desired throughput, buffer fullness, signal quality, and/or other relevant information.

Wireless cells, access points, clients, or other devices that communicate using antennas may use an enhanced antenna system. An enhanced antenna system may use, for example, an antenna physical sector arrangement, switching, and attenuation to increase receive sensitivity, reduce the effects of noise, provide improved coverage, provide increased transmission range, and/or to allow higher antenna density as compared to a simple antenna. An enhanced antenna system may, for example, combine antennas with other apparatus, use antenna positioning, shielding, channel assignment, intermittent use, noise sampling, operational protocols, and/or a combination of techniques to improve performance.

An enhanced antenna system may include one or more antennas of various types such as, for example, omni-directional, directional, patch, parabolic, beam, yagi, MIMO, antenna arrays, adaptive antenna arrays, or similar devices. In one embodiment, an antenna for an enhanced antenna system may be a directional antenna with about 5 to 8 dB attenuation in signal strength from the operation center to the edge of the physical sector and at least about 15 dB signal rejection from behind the antenna. The attenuation from operation center to physical sector edge may range from about 3 dB to 20 dB. The amount of attenuation from the operation center to the physical sector edge and the signal rejection from behind the antenna may be modified by use of a horn (as described below) or similar reflective element such as a parabolic reflector, a four-corner reflector, or any reflector capable of producing a desired area of coverage. A horn, or a reflective element, also allows omni-directional and other types of antennas to be adapted to provide desired characteristics and angle of coverage. The desired antenna may be used with or without the horn.

A Multiple Input Multiple Output (MIMO) antenna is not a single antenna, but many antennas. In this invention, a MIMO antenna array may be used as any other single antenna type may be used. Just as a single antenna services a physical sector of a certain angle and area of coverage, a MIMO antenna array may provide a desired angle and area of coverage. For example, if four 90-degree, directional antennas provide about 360 degrees of non-overlapping coverage, each directional antenna may be replaced by a MIMO antenna array to provide similar coverage. The MIMO antenna may be used in both wireless cells and clients. MIMO antennas may use any combination of spatial, polarization, or angle antenna diversity. The MIMO antenna array may be fixed or adaptive for either transmit, receive, or both. When receiving, the MIMO antenna may use, for example, a maximum ratio combiner, an optimal linear combiner, selection diversity, or any combination of these methods or other methods for combining the signals from multiple antennas into a single signal. When transmitting, the MIMO antenna may use any type of encoding including, for example, OFDM, space-time-codes, or weighting of the antenna signals in the array to accomplish beam steering. During transmission or reception, all or any subset of antennas in the MIMO array may be used or selection diversity may be used to limit the number of antennas used. Antenna diversity may be used in the transmit path, in the receive path, or in both transmit and receive paths. The signal from each antenna, transmitted or received, may or may not be weighted.

Servicing a physical sector with a MIMO antenna means that all antennas in the MIMO array use the channel (discussed below) assigned to the physical sector. Signal attenuation may be added after each antenna, after the signal combiner, or in the signal processor that manipulates the incoming signals.

Although MIMO antennas are arrays of antennas, any antenna array may be used as a single antenna or a MIMO antenna array may be used. For example, a directional antenna with about 120-degree angle of coverage may be replaced by an antenna array that provides similar coverage. The array may be fixed or adaptive. Adaptive arrays may use adaptive array weights to transmit directional beams within the angle and area of coverage to send a stronger signal to a desired client. During reception, an adaptive array may use array weights to direct a beam substantially towards the transmitting client and substantially null out any sources of interference.

An exemplary embodiment of an enhanced antenna system uses multiple directional antennas arranged with overlapping physical sectors combined with attenuators only in the receive path. Six exemplary embodiments of enhanced antenna systems are discussed below; however, one skilled in the art will appreciate that enhanced antenna systems are not limited to the embodiments described.

Figure 30:
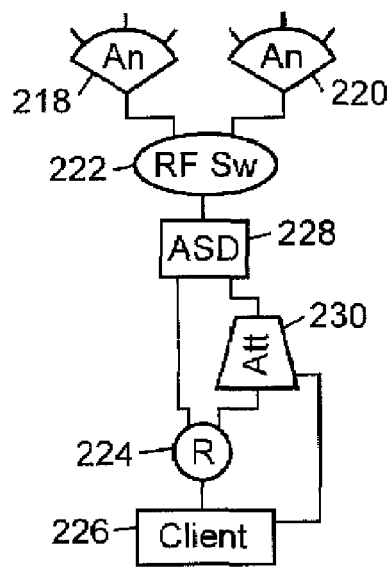
FIG. 30 is a block diagram of an exemplary two-antenna, client enhanced antenna system with an attenuator in the radio receive path.
Figure 31:
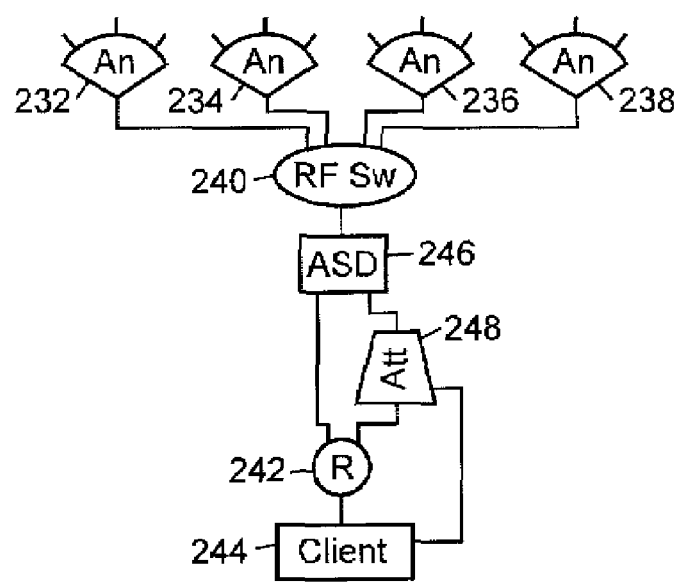
FIG. 31 is a block diagram of an exemplary four-antenna, client enhanced antenna system with an attenuator in the radio receive path.

A first embodiment of an enhanced antenna system uses multiple directional antennas arranged such that the antenna's physical sectors are adjacent, but non-overlapping. During communication, only one antenna is active at a time. The antenna used to communicate is selected by measuring the signal strength of the desired receive signal through each antenna. The antenna that detects the strongest receive signal is used and the other antennas are either disabled or ignored. The first embodiment of an enhanced antenna system provides increased performance by using the antenna that provides the best reception. One potential use of the first embodiment of an enhanced antenna system is with a client that exclusively uses the antenna that provides the best receive signal from the wireless cell. Attenuation, as shown in the receive path in FIG. 30 and FIG. 31, is used to further decrease interference from unwanted signals.

Non-overlapping, adjacent antenna arrangements suitable for the enhanced antenna system first embodiment are shown in FIG. 12, FIG. 13, FIG. 15, FIG. 16, and FIG. 18. Hardware capable of supporting the first embodiment of an enhanced antenna system is shown in FIG. 28 through FIG. 31. Clearly, the coverage patterns of FIG. 12, FIG. 13, and FIG. 15 include three directional antennas. The hardware of FIG. 29 or FIG. 31 may provide the coverage pattern shown in FIG. 16. The antennas are not required to have substantially equal angle of coverage or physical sector size; however, four directional antennas with about 45-degree angle of coverage may produce the coverage pattern shown in FIG. 16. Any of the antennas 232, 234, 236, or 238 may be assigned to physical sectors 86, 88, 90, or 92. One possible assignment is to assign antenna 232, 234, 236, and 238 to physical sectors 86, 88, 90, and 92 respectively.

Other potential variations on the enhanced antenna system first embodiment may include using the antenna that receives the strongest receive signal exclusively for reception and the antenna that transmits the strongest transmit signal exclusively for transmission without requiring the transmit and receive antennas to be the same. The antennas may also be arranged to be non-overlapping, but also non-adjacent.

A second embodiment of an enhanced antenna system uses multiple directional antennas arranged such that the antenna physical sectors overlap. Unlike the first embodiment of an enhanced antenna system, multiple antennas in the second embodiment may be simultaneously active, which may increase the desirability of the second embodiment for a wireless cell. Exemplary patterns for overlapping physical sectors are shown in FIG. 4, FIG. 5, FIG. 14, FIG. 17, and FIG. 20. The exemplary antennas and hardware shown in FIG. 22, FIG. 25, FIG. 28, or FIG. 29 may be adapted to provide overlapping coverage and to implement the second embodiment of an enhanced antenna system. The coverage of two antennas in each virtual sector may allow the second embodiment of an enhanced antenna system to use the best antenna of two antennas to communicate with a device in the virtual sector. Although the second embodiment of an enhanced antenna system uses two antennas per virtual sector, there is essentially no limitation on the number of antennas per virtual sector. In one embodiment, each physical sector may be of similar size and the physical sectors may overlap two adjacent physical sectors by about 50% thereby forming virtual sectors with angle of coverage of half of the physical sector angle of coverage.

Figure 53:
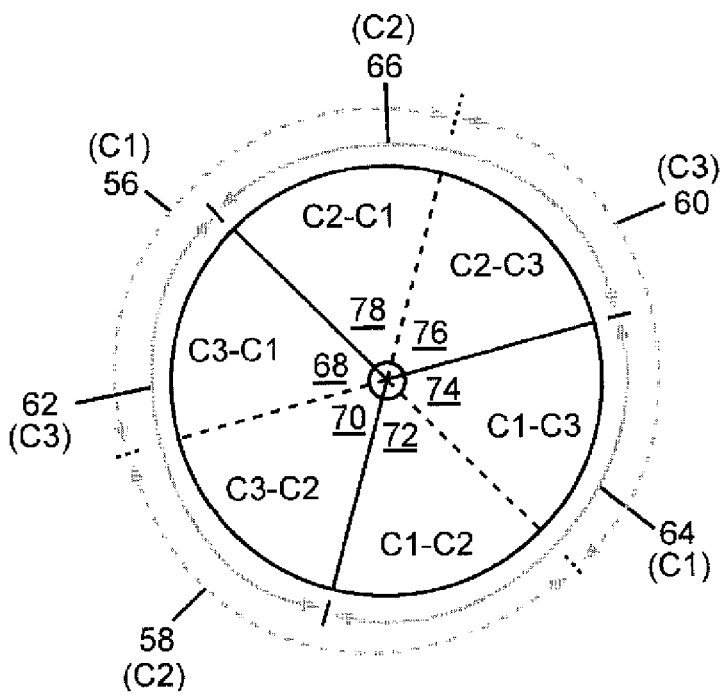
FIG. 53 is a diagram of an exemplary wireless cell formed using six overlapping physical sectors that form six virtual sectors and provides about 360-degree coverage.

Producing the coverage pattern of FIG. 14 may include six antennas with angular physical sectors of about 120 degrees. The hardware of FIG. 22 may be adapted to provide the coverage shown in FIG. 14 by setting the physical sectors of antennas 118 through 128 to substantially correspond to physical sectors 56 through 64. However, the exemplary antenna arrangement may include the operational centers of the two antennas attached to any single radio (136, 138, or 140) by way of an RF switch (130, 132, or 134) point in substantially opposite directions. Off-the-shelf radios may include built-in RF switches, known as diversity switches, and since a radio uses a single channel, assigning antennas attached to the same RF switch (diversity switch) to face substantially opposite directions enables the physical sectors to substantially conform to exemplary channel assignment techniques disclosed below. The operational center of physical sector 56 points in the substantially opposite direction of physical sector 64. Physical sectors 58 and 66, and 60 and 62 also point in substantially opposite directions. One exemplary antenna assignment is to assign the physical sectors of antennas 118, 120, 122, 124, 126, and 128 to substantially correspond to 56, 64, 58, 66, 60, and 62 respectively. Although channel assignments have not yet been described, the exemplary channel assignment for a three-channel system is shown in FIG. 53. Assigning antennas attached to the same radio to face substantially opposite directions minimizes the likelihood that adjacent physical sectors do not use the same channel.

Figure 25:
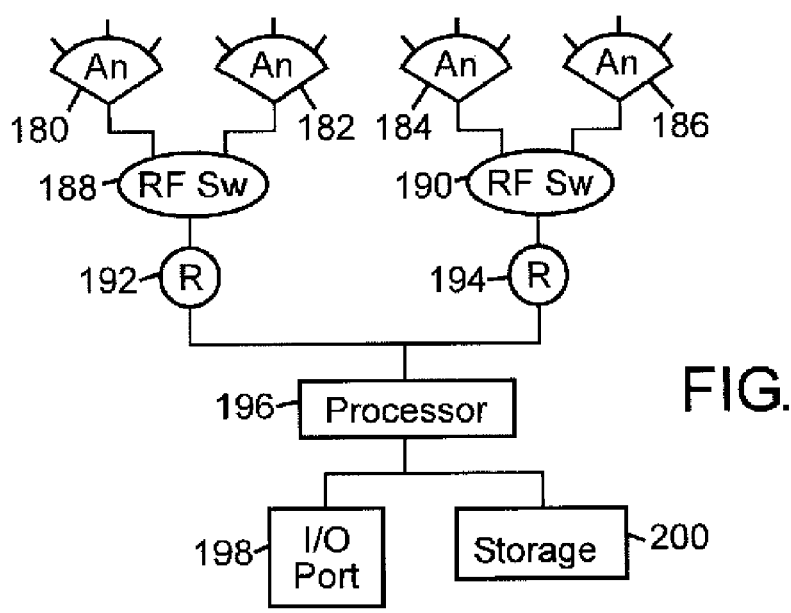
FIG. 25 is a block diagram of an exemplary four antenna, two-radio wireless cell.
Figure 32:
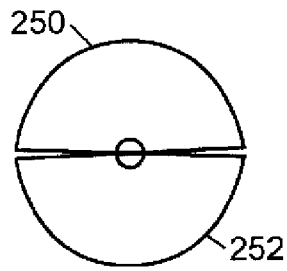
FIG. 32 is a diagram of an exemplary coverage pattern for two, non-overlapping directional antennas providing about 360-degree coverage.
Figure 33:
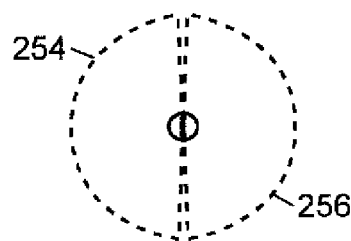
FIG. 33 is a diagram of an exemplary coverage pattern of two, non-overlapping directional antennas providing about 360-degree coverage with orientation different than the coverage pattern of FIG. 32.
Figure 34:
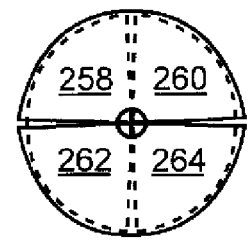
FIG. 34 is a diagram of an exemplary coverage of four overlapping physical sectors providing about 360-degree coverage and forming four virtual sectors.

The exemplary hardware of FIG. 25 may be adapted to provide the coverage shown in FIG. 34. Using the exemplary antenna physical sector assignment for off-the-shelf radios described above, the physical sectors of antennas about 180 and 182 may substantially correspond to physical sectors 250 and 252 in FIG. 32, and the physical sectors of antennas 184 and 186 may substantially correspond to physical sectors 254 and 256 of FIG. 33. Overlapping the coverage of FIG. 32 and FIG. 33 produces the pattern shown in FIG. 34. The angle of coverage of each antenna may be about 180 degrees. Other physical sector arrangements may also meet the opposing sector preference.

Figure 17:
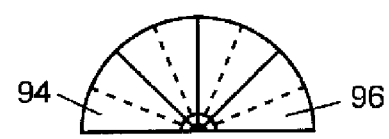
FIG. 17 is a diagram of seven exemplary overlapping physical sectors forming six virtual sectors and providing about 180-degree coverage.

Wireless coverage patterns like that shown in FIG. 17 may not meet an exemplary physical sector assignment for an off-the-shelf radio described above because no physical sectors point in substantially opposite directions. In such circumstances, antennas may be attached to the common radio through an RF switch and arranged such that their physical sectors are not adjacent or overlapping. Possible arrangements become apparent when channel assignment is incorporated as described below.

Figure 29:
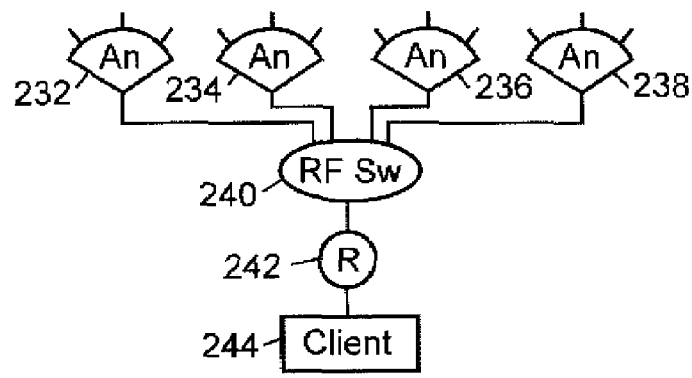
FIG. 29 is a block diagram of an exemplary four-antenna, client enhanced antenna system.

The hardware shown in FIG. 29 does not represent a current off-the-shelf-radio because the radio through an RF switch attaches to more than two antennas. However, the antenna physical sectors may be arranged to provide the overlapping wireless cell coverage pattern of FIG. 34, thereby meeting the enhanced antenna system second embodiment feature of overlapping sectors.

Another possible antenna physical sector arrangement includes physical sectors which overlap by about 100% thereby forming virtual sectors substantially equal in size to a physical sector. An example of such a scheme may exist where at least two antenna physical sectors are assigned to position 62 in FIG. 13, at least two additional antenna physical sectors are assigned to position 64, and at least an additional two antennas to position 66. The physical sectors of the antennas in each position 62, 64, or 66 may completely overlap and form virtual sectors the size of the individual antenna physical sector. Although an exemplary hardware to support such arrangements is not described in this application, the arrangement is mentioned to emphasize that the enhanced antenna system embodiments disclosed are not limitations, but specific examples of possible approaches.

Figure 24:
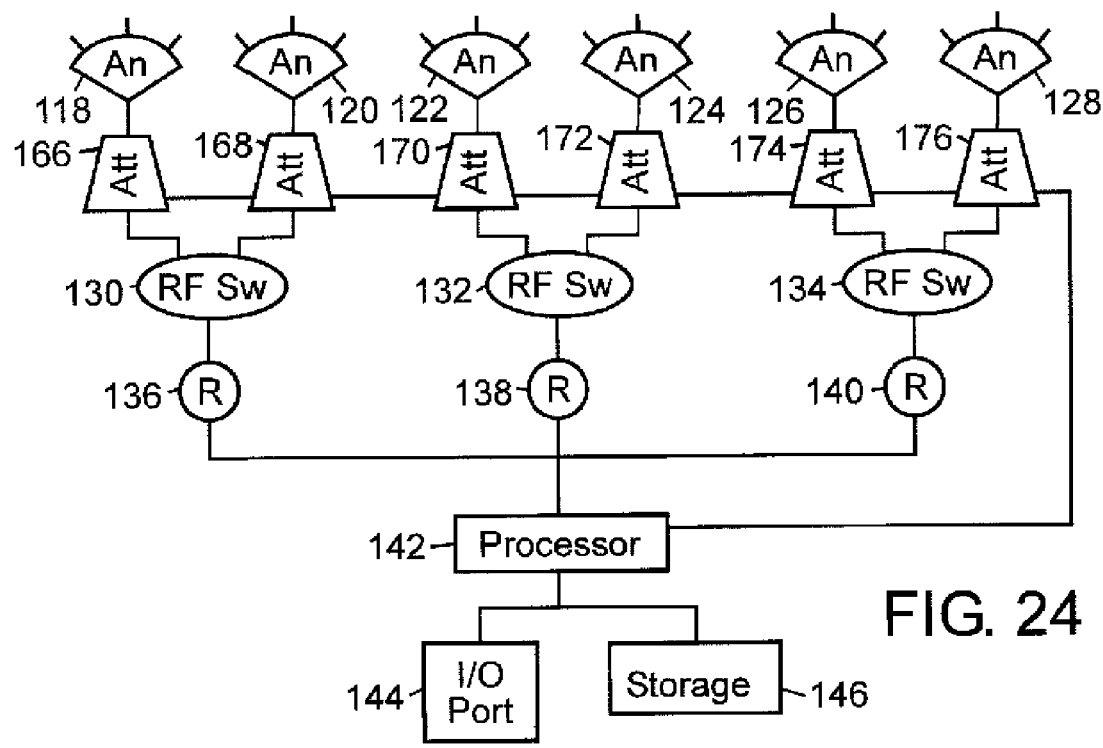
FIG. 24 is a block diagram of an exemplary six antenna, three-radio wireless cell with an attenuator in each antenna path.
Figure 27:
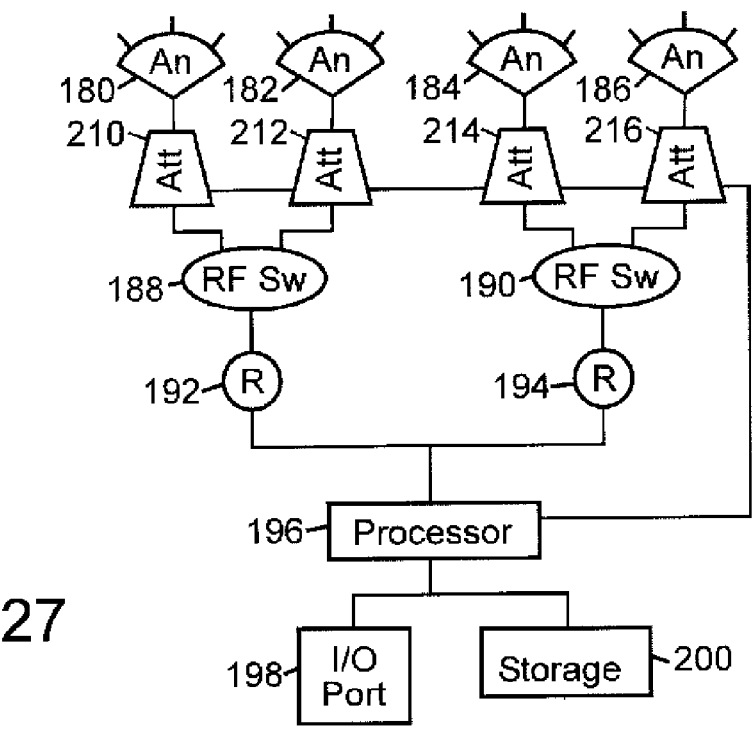
FIG. 27 is a block diagram of an exemplary four antenna, two-radio wireless cell with an attenuator in each antenna path.

A third embodiment of an enhanced antenna system is similar to the second embodiment in that it uses multiple directional antennas arranged such that the antenna physical sectors overlap; however, the third embodiment may be different in that, for example, an attenuator is placed between each antenna and its corresponding RF switch as shown in FIG. 24 and FIG. 27. The third embodiment has the advantage of virtual sectors covered by multiple antennas, along with the ability to attenuate the effects of unwanted receive signals with the attenuators. The level of attenuation may be changed between transmission and reception; thereby, allowing the wireless cell to attenuate unwanted receive signals while still transmitting at substantially full strength. The attenuator and methods of attenuation are described in more detail below. The arrangement of the antenna physical sectors of the enhanced antenna system third embodiment may be similar to the overlapping arrangements described in the second embodiment.

The fourth embodiment of an enhanced antenna system is the exemplary embodiment. Like the third embodiment, the fourth enhanced antenna system embodiment uses multiple directional antennas arranged such that the antenna physical sectors overlap. The fourth embodiment also includes attenuators, but the attenuators of the fourth embodiment are placed only in the receive path as shown in FIG. 23, FIG. 26, FIG. 30 and FIG. 31. Placing the attenuator only in the receive path, unlike the third embodiment, minimizes the effect of the transmit signals by the attenuator. The fourth embodiment includes virtual sectors covered by multiple antennas, and the ability to attenuate the effects of unwanted receive signals using the attenuators without affecting the transmit signal. The fourth embodiment may use the attenuators to decrease the receive noise floor while at the same time providing a strong transmit signal.

Current off-the-shelf radios do not provide an attenuator in the receive path; however, attenuation of only the receive signal may be accomplished by other methods. Attenuation is more fully discussed below. Arranging antenna physical sectors in substantially opposing positions may still be desired where the radio connects through an RF switch to two antennas.

The fifth embodiment of an enhanced antenna system is similar to the third embodiment in that it includes attenuators placed between each antenna and its corresponding RF switch as shown in FIG. 24 and FIG. 27; however, the fifth embodiment may not use overlapping physical sectors. Although the fifth embodiment may not include virtual sectors, the fifth embodiment provides multiple sectors and the ability to attenuate unwanted receive signals. The fifth embodiment is similar to the third embodiment where the transmit signal may be attenuated by the attenuator; however, transmit and receive operations may use different attenuation values.

An exemplary arrangement of antenna physical sectors may be adjacent as shown in FIG. 12, FIG. 13, FIG. 15, FIG. 16, FIG. 32, and FIG. 33; however, adjacent physical sectors is not a requirement. The physical sector arrangement of FIG. 19 is possible, or an arrangement where some physical sectors are adjacent, but not other sectors. The physical sectors are not required to have the same angle of coverage or physical sector size. The wireless cell coverage may range from narrow up to about 360 degrees.

The hardware shown in FIG. 24 may support the physical sector pattern shown in FIG. 42. As described in the second embodiment, an exemplary antenna physical sector assignment may include the antennas that are attached to the same radio point in the substantially opposite direction. An exemplary assignment may be met by assigning antenna 118, 120, 122, 124, 126, and 128 to substantially correspond to position 276, 282, 278, 284, 280, and 286, respectively, as depicted in FIG. 42. Other assignments that meet the preference are possible.

The hardware shown in FIG. 27 may support the physical sector pattern shown in FIG. 16. As described in the second embodiment, if the physical sectors of the wireless cell coverage do not face in substantially opposite directions, an exemplary antenna physical sector placement may arrange physical sectors of antennas connected to the same radio so they are not adjacent. An exemplary arrangement may be met by assigning the physical sectors of antennas about 180, 182, 184, and 186 to positions 86, 90, 88, and 92, respectively. Other assignments that meet the preference are also possible. It is also possible to arrange the physical sectors attached to the same radio to adjacent locations among other suitable arrangements.

The sixth embodiment of an enhanced antenna system is similar to the fifth embodiment in that the physical sectors are non-overlapping, but it is also like the fourth enhanced antenna system embodiment because it has attenuators in the receive path. While the sixth embodiment may not have virtual sectors, it may attenuate unwanted receive signals without substantially affecting transmit signal strength.

The considerations for antenna physical sector arrangement are similar to those of the fifth embodiment. The hardware shown in FIG. 23, FIG. 26, FIG. 30, and FIG. 31 may support the physical sector patterns shown in FIG. 42, FIG. 16, FIG. 19, and FIG. 16, respectively. As mentioned in the fourth enhanced antenna system embodiment, current off-the-shelf radios may not provide an attenuator in the receive path; however, physical sector assignment for the sixth enhanced antenna system embodiment may be similar to the approach used in the fourth enhanced antenna system embodiment.

In certain enhanced antenna system embodiments, attenuators may decrease interference from unwanted signals. Attenuating the incoming signal decreases the level of the desired signal and the undesirable noise thereby improving the desired signal's signal-to-noise ratio. Attenuation may improve the signal-to-noise ratio even when the radio uses automatic gain control (AGC) to try to acquire weaker incoming signals. The exemplary attenuators in FIG. 23, FIG. 24, FIG. 26, FIG. 27, FIG. 30, and FIG. 31 are shown as discrete devices. The attenuators may be separate components, or the attenuators may be integrated into the radio, the ASD, the RF switch, or the antenna. The attenuators may have a fixed amount, adjustable or any varying amount of attenuation. In one embodiment, attenuator is adjustable. The attenuators may include any suitable software and/or hardware and incorporate digital signal processing. Although some enhanced antenna system embodiments include attenuation, the embodiments are not limited to using hardware attenuators. Moreover, the level of attenuation may be different for transmission and reception.

Figure 35:
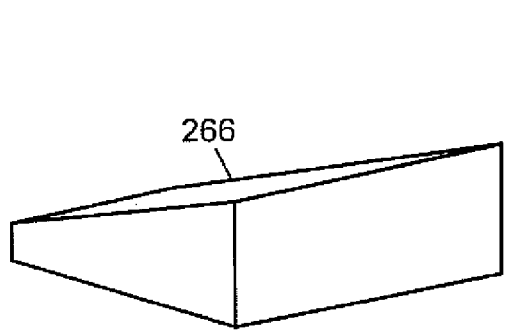
FIG. 35 is a diagram of an exemplary horn.

An exemplary horn 266 is depicted in FIG. 35. A horn is best described as cowbell shaped and hollow. The horn may be opened at a single end; however, depending on the type of antenna used or the type of antenna coverage desired, it may be open at both ends and possible one or more sides. An exemplary shape of the opening is rectangular; however, it may also be oval, square, triangular, polygon, or any other shape. A purpose of the horn is to, for example, at least one of decrease interference between adjacent antennas, increase signal attenuation behind the antenna, enable any antenna type to function as a directional antenna, and provide control over the shape of the antenna's physical sector. An exemplary material for the horn is metal-coated plastic; however, a horn may be made out of metal, plastic, ceramic, semi-metals, composite materials, graphite, glass, a combination of materials, and/or laminated materials. A horn made from non-metallic materials may be coated with metal, carbon, or some other material that reflects or absorbs RF energy.

Figure 39:
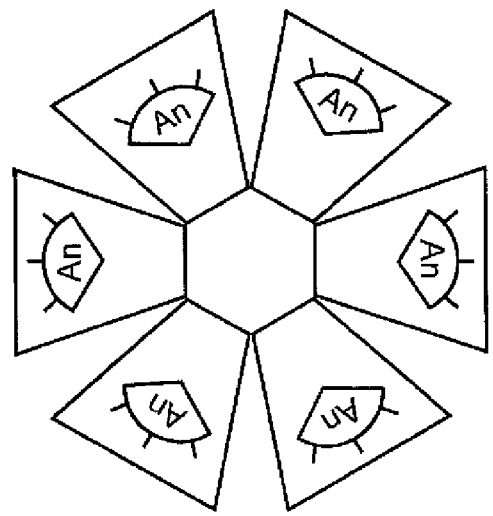
FIG. 39 is a diagram of an exemplary group of horns positioned to provide about 360-degree overlapping or non-overlapping coverage.

The horn material may be solid, but may also be a mesh, or a coated mesh. The thickness of the material of the horn may be uniform or variable. The cavity size may range from slightly larger than the antenna to many times larger than the antenna depending on the frequency of operation and the desired area of coverage. The antenna may be mounted to the horn and the horn to its surroundings using any systems and methods. The mounting method may be adjustable, so that the antenna position within the horn may be adjusted, but the antenna position may also be fixed. The horn opening may be left uncovered, but it may also be covered partially or wholly with any type of material that does not significantly interfere with the radio waves. Such materials may include, for example cloth, plastic, glass, plexi-glass, or any similar material. In one embodiment, a single antenna is mounted in a horn, but multiple antennas may be mounted in a horn. The RF reflecting or absorbing material on the top and bottom of the horn may be removed to allow the antenna to broadcast and receive above and below its mounted position. A horn with the top and bottom removed may still provide shielding from adjacent antennas as shown in FIG. 39.

Figures 36, 37, 38:
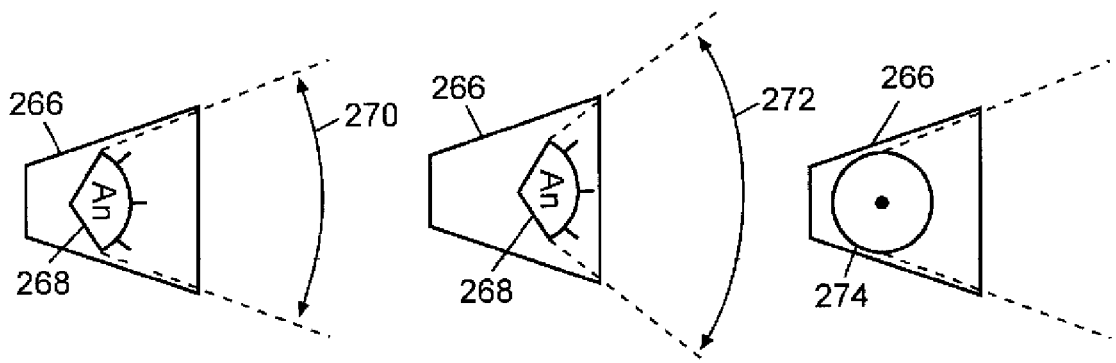
FIG. 36 is a diagram of an exemplary antenna positioned in a horn to reduce angle of coverage.
FIG. 37 is a diagram of an exemplary antenna positioned in a horn to increase angle of coverage.
FIG. 38 is a diagram of an exemplary omni-directional antenna positioned in a horn to provide directional coverage.

A single, directional antenna 268 is mounted in horn 266 in FIG. 36 and FIG. 37 as viewed from the top in relation to FIG. 35. The effect of antenna position in the horn is shown in FIG. 36 and FIG. 37. In FIG. 36, the antenna is mounted farther from the opening than in FIG. 37. The angular physical sector 270 of FIG. 36 is less than the angular physical sector 272 of FIG. 37; thereby showing that the position of the antenna in the horn influences physical sector shape and size. An omni-directional antenna 274 is mounted in a horn 266 in FIG. 38. The physical sector shape and size of FIG. 38 may be substantially equivalent to the physical sector shape and size of FIG. 36; thereby demonstrating that the horn may enable any antenna type to function as a directional antenna.

Multiple horns may be used together to shape wireless cell coverage. Six horns, each with one directional antenna, as shown in FIG. 39, provide the non-overlapping wireless cell coverage pattern of FIG. 41 when the antennas are positioned towards the back of the horn as shown in FIG. 36. Moving the antennas to the front of the horns shown in FIG. 37 results in the overlapping wireless cell coverage shown in FIG. 14. Multiple horns do not need to be positioned on the same horizontal plane. Horns may be placed above or below each other to provide the desired wireless cell coverage pattern. Multiple horns may be mounted relative to each other in any shape or pattern for producing the desired wireless cell pattern. An exemplary relative positioning for about 360-degree coverage by six antennas is shown in FIG. 39.

The enhanced antenna system introduced above related briefly to the hardware shown in FIG. 22 through FIG. 31 and to physical sector coverage patterns shown in FIG. 12 through FIG. 20, FIG. 32 through FIG. 34, FIG. 42, and FIG. 44. While the enhanced antenna system considers, for example, the number of antennas, overlapping or non-overlapping antenna physical sectors, and the use and placement of attenuators, the enhanced antenna system is only part of a wireless cell. Radios are an additional, indispensable part of a wireless cell. Other components of a wireless cell may include, for example, at least one of RF switches, ASDs, processors, I/O ports, storage, attenuators in addition to those used in the enhanced antenna system, packet switches, horns, base band processors, digital signal processors, and other analog or digital electronic components, or connections, and busses. No limitation is placed on the number of radios, antennas, other components, or the organization of the components in a wireless cell.

Various wireless cell hardware embodiments are presented in this application. Wherever possible, the hardware embodiments are described in terms of a previously described enhanced antenna system embodiment plus other components. The wireless cell hardware embodiments are specific, non-limiting examples. Several hardware embodiments use configurations adapted for off-the-shelf radios that have an integrated RF switch known as a diversity switch. While the hardware embodiments take advantage of component configurations inexpensively available on the open market, the invention is not limited to components or component configurations available on the open market.

In hardware embodiments that use attenuators or RF switches, the processor may control both thereby enabling the processor to adjust attenuation and the physical sector attached to the radio on a frame-by-frame basis to increase efficiency, increase performance, and/or decrease interference. In some instances, the radio may control the RF switch and the processor may control the attenuator, or it is possible the radio may control both. If the attenuators are not variable, neither the processor nor the radio may control them.

Wireless cell hardware embodiments may be shown with an optional I/O port and local storage. An I/O port is a connection to a non-wireless media and a protocol which may be different than the protocol used by the wireless cell. For example, an I/O port connection may be at least one of an Ethernet, infrared, USB, IEEE 1394, optical, or other type of connection. The presence of an I/O port may enable the wireless cell to function as an access point as described above. Local storage may be composed of any type of storage including, for example, at least one of RAM, ROM, flash, memory stick, hard disk drive, RW CDROM, or DVD. Local storage may save on a temporary or permanent basis any type of information including, for example, at least one of data, video, routing tables, processor code, or algorithms. An exemplary local storage may be a disk drive.

The wireless cell embodiments may use any protocol to communicate with other wireless cells, clients, or other wireless devices. Possible communication protocols include, for example, at least one of 802.11a, 802.11b, 802.11g, 802.15, 802.16, Bluetooth, and ultra-wideband. An exemplary communication protocol is 802.11b/g.

Figure 22:
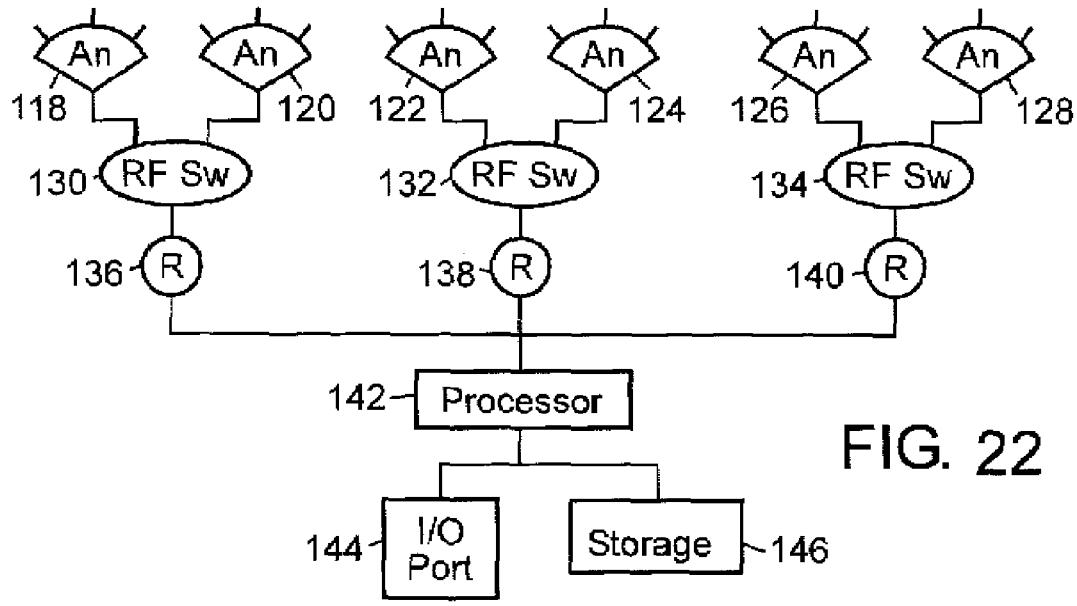
FIG. 22 is a block diagram of an exemplary six antenna, three-radio wireless cell.

The first hardware embodiment includes six antennas (118, 120, 122, 124, 126, 128), three RF switches (130, 132, 134), three radios (136, 138, 140), and one processor 142, as shown in FIG. 22, and uses the second embodiment of an enhanced antenna system (overlapping physical sectors, no attenuators). In one embodiment, the RF switches 130, 132, and 134 are integrated with radios 136, 138, and 140 respectively; however, the radios and RF switches may be separate. Either the radio or the processor may control the RF switches. The processor 142 sends and receives data and control information to and from each radio. As mentioned above, the first hardware embodiment may include I/O port 144 and local storage 146. Furthermore, as described above, the first hardware embodiment may implement the third, fourth, fifth and sixth antenna system embodiments if the attenuation is performed in the processor.

Figure 23:
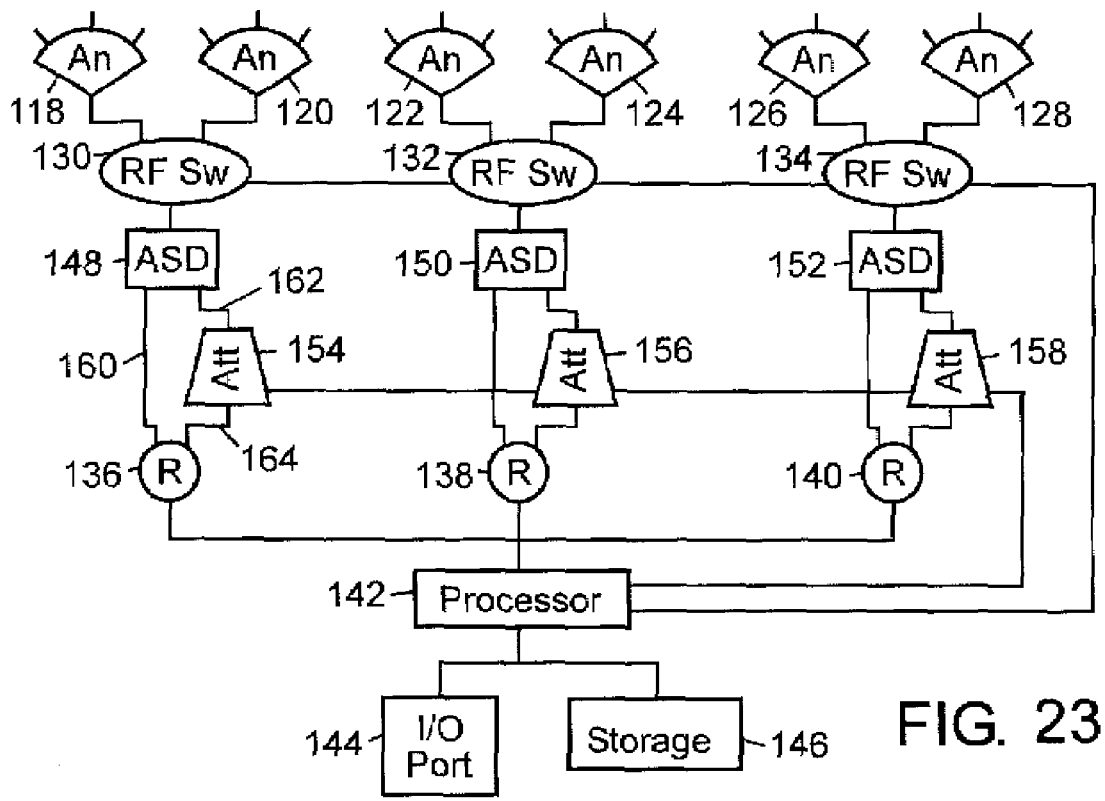
FIG. 23 is a block diagram of an exemplary six antenna, three-radio wireless cell with an attenuator in each radio receive path.

The second hardware embodiment includes six antennas (118, 120, 122, 124, 126, 128), three RF switches (130, 132, 134), three ASDs (148, 150, 152), three attenuators (154, 156, 158), three radios (136, 138, 140), and one processor 142, as shown in FIG. 23. The second hardware embodiment uses the sixth embodiment of an enhanced antenna system (non-overlapping physical sectors, attenuator in the receive path). In one embodiment, RF switches 130, 132, 134, ASDs 148, 150, 152, and attenuators 154, 156, 158 are integrated with radios 136, 138, and 140 respectively; however, all the components may be separate. The attenuators may include fixed or variable attenuation. The second hardware embodiment may include I/O port 144 and local storage 146.

The third hardware embodiment is an exemplary wireless cell embodiment. The third hardware embodiment is similar to the second hardware embodiment except the third hardware embodiment, for example, uses the fourth embodiment of an enhanced antenna system (overlapping physical sectors, attenuator in the receive path). The third hardware embodiment may include I/O port 144 and local storage 146.

The fourth hardware embodiment includes six antennas (118, 120, 122, 124, 126, 128), six attenuators (166, 168, 170, 172, 174, 176), three RF switches (130, 132, 134), three radios (136, 138, 140), and one processor 142, as shown in FIG. 24. The fourth hardware embodiment uses the fifth embodiment of an enhanced antenna system (non-overlapping physical sectors, attenuator next to the antenna). In one embodiment, RF switches 130, 132, 134, are integrated with radios 136, 138, and 140 respectively; however, the radios and RF switches may be separate. The attenuators may be of fix or variable attenuation. The fourth hardware embodiment may include I/O port 144 and local storage 146.

The fifth hardware embodiment is similar to the fourth hardware embodiment except the fifth hardware embodiment, for example, uses the third embodiment of an enhanced antenna system (overlapping physical sectors, attenuator next to the antenna). The fifth hardware embodiment may include I/O port 144 and local storage 146.

The sixth hardware embodiment includes four antennas (about 180, 182, 184, 186), two RF switches (188, 190), two radios (192, 194), and one processor 196, as shown in FIG. 25, and uses the second embodiment of an enhanced antenna system (overlapping physical sectors, no attenuators). In one embodiment, the RF switches 188, and 190 are integrated with radios 192 and 194, respectively; however, the radios and RF switches may be separate. The processor 196 sends and receives data and control information to and from each radio. As mentioned above, the sixth hardware embodiment may include I/O port 198 and local storage 200.

Figure 26:
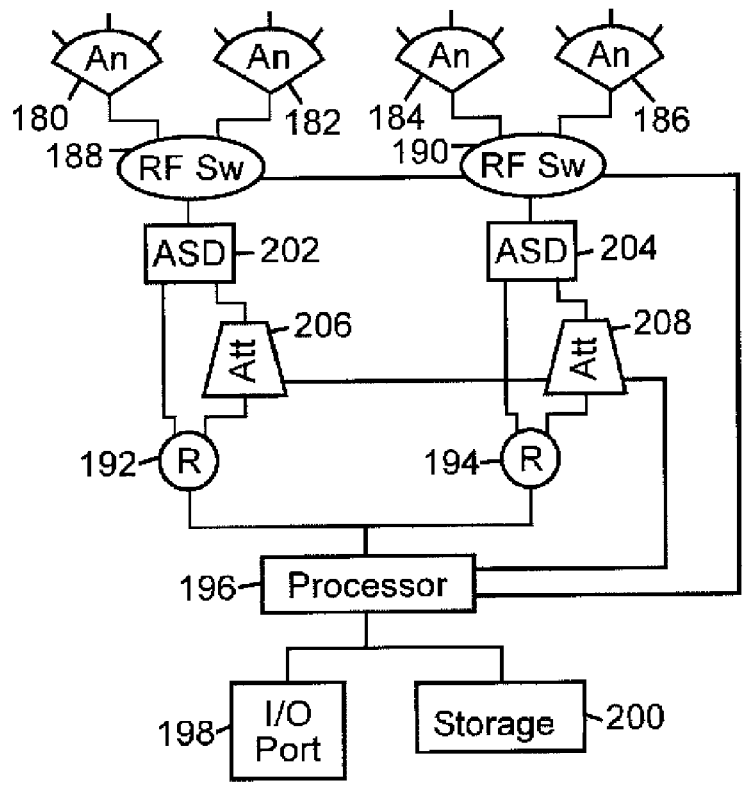
FIG. 26 is a block diagram of an exemplary four antenna, two-radio wireless cell with an attenuator in each radio receive path.

The seventh hardware embodiment includes four antennas (about 180, 182, 184, 186), two RF switches (188, 190), two ASDs (202, 204), two attenuators (206, 208), two radios (192, 194), and one processor 196, as shown in FIG. 26. The seventh hardware embodiment uses the sixth embodiment of an enhanced antenna system (non-overlapping physical sectors, attenuator in the receive path). In one embodiment, RF switches 188, 190, ASDs 202, 204, and attenuators 206, 208 are integrated with radios 192, and 194 respectively; however, all the components may be separate. The attenuators may be of fixed or variable attenuation. The seventh hardware embodiment may include I/O port 198 and local storage 200.

The eighth hardware embodiment is similar to the seventh hardware embodiment except the eighth hardware embodiment, for example, uses the fourth embodiment of an enhanced antenna system (overlapping physical sectors, attenuator in the receive path). The eighth hardware embodiment may include I/O port 198 and local storage 200.

The ninth hardware embodiment has four antennas (about 180, 182, 184, 186), four attenuators (210, 212, 214, 216), two RF switches (188, 190), two radios (192, 194), and one processor 196, as shown in FIG. 27. The fourth hardware embodiment uses the fifth embodiment of an enhanced antenna system (non-overlapping physical sectors, attenuator next to the antenna). In one embodiment, RF switches 188, and 190, are integrated with radios 192 and 194, respectively; however, the radios and RF switches may be separate. The attenuators may be of fixed or variable attenuation. The ninth hardware embodiment may include I/O port 198 and local storage 200.

The tenth hardware embodiment is similar to the ninth hardware embodiment except the tenth hardware embodiment, for example, uses the third embodiment of an enhanced antenna system (overlapping physical sectors, attenuator next to the antenna). The tenth hardware embodiment may include I/O port 198 and local storage 200.

Now turning to exemplary client embodiments. Performance of any client may be improved by using an enhanced antenna system embodiment to reduce interference. As mentioned in the first embodiment of an enhanced antenna system, a client generally uses only one antenna and communicates with a single device at a time because clients generally have only one radio. Although an enhanced antenna system may be adapted to enable only a single antenna at a time, enhanced antenna systems do not limit a client to one radio, or to using only one antenna at a time.

Each embodiment described below shows a single radio and assumes that only one antenna is active a time; however, the embodiments may include any number of antennas available, any number of antennas in simultaneous use, any number of radios, overlapping or non-overlapping physical sectors, physical sector positioning, and/or communication protocols used. In the embodiments described, the radio may measure receive signal strength, or signal quality, through each available antenna then may use only the antenna that delivers the highest quality signal. The frequency of testing all antennas to determine which one provides the highest quality signal may be accomplished, for example, periodically by fixed or random interval, after each transmission, after each frame, as commanded by the wireless cell, when the signal strength of the receive signal decreases below a predetermined threshold, or any at any other time.

An exemplary client embodiment may include two antennas, an off-the-shelf, cost-effective radio with an integrated RF switch (diversity switch), and uses the first embodiment of an enhanced antenna system; however, other hardware arrangements are possible. An exemplary client uses the 802.11 protocols and interfaces to a wireless cell that uses the same 802.11 protocols; however, any other protocol for both client and wireless cell may be used. An exemplary client also uses extensions to the 802.11 protocols to communicate control information and requests to the wireless cell to improve data throughput, transmission signal strengths, noise suppression, and other performance factors. The RF switch may be controlled by the radio (especially if the RF switch is integrated with the radio); however, selection of the antenna by the RF switch may also be controlled by, for example, the client, the wireless cell by way of command, or manually.

Figure 28:
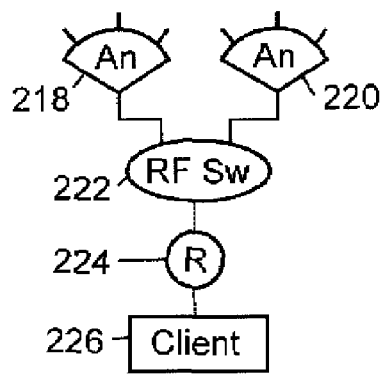
FIG. 28 is a block diagram of an exemplary two-antenna, client enhanced antenna system.

The first client embodiment may include two antennas (218, 220), one RF switch (222), one radio (224), and the client (226) as shown in FIG. 28. The first client embodiment uses the first embodiment of an enhanced antenna system. In one embodiment, the first embodiment of the enhanced antenna system when used with the first client embodiment is arranged to provide about 360-degree coverage, but it is not required. The first client embodiment using the first embodiment of an enhanced antenna system may provide the coverage patterns shown in FIG. 19, FIG. 32, or any other pattern of two non-overlapping physical sectors. In one embodiment, the RF switch 222 is integrated with the radio 224 and is available as an off-the-shelf component, but integration is not required. The first client embodiment may alternately use the second embodiment of an enhanced antenna system to allow overlapping physical sectors; however, only one antenna may be enabled at a time.

The second client embodiment may include two antennas (218, 220), one RF switch (222), one ASD (228), one attenuator (230), one radio (224), and the client (226), as shown in FIG. 30. The second client embodiment is similar to the first client embodiment except it uses the sixth embodiment of an enhanced antenna system (non-overlapping physical sectors, attenuator in the receive path). The sixth embodiment of an enhanced antenna system allows the second client embodiment to attenuate the receive signal to reduce interference from unwanted sources. In one embodiment, the RF switch 222, the ASD 228, and the attenuator 230 are integrated with the radio 224, but integration is not required. The attenuator may be of fixed or variable attenuation. In one embodiment, the attenuator is variable and controlled by the client on a per frame basis; however, the attenuator may also be controlled by the radio and use any algorithm or frequency of adjustment. The second client embodiment may alternately use the enhanced antenna system fourth embodiment to allow overlapping physical sectors; however, only one antenna may be enabled at a time.

The third client embodiment is similar to the first client embodiment except, for example, the third client embodiment has four antennas instead of two. The third client embodiment has four antennas (232, 234, 236, and 238), one RF switch (240), one radio (242), and the client (244) as shown in FIG. 29. The third client embodiment uses the enhanced antenna system first embodiment. In one embodiment, the first embodiment of the enhanced antenna system when used with the third client embodiment is arranged to provide about 360-degree coverage, but it is not required. The third client embodiment using the enhanced antenna system of the first embodiment may provide the coverage patterns shown in FIG. 16, or any other pattern of four non-overlapping physical sectors. The physical sectors are not required to be adjacent. In one embodiment, the RF switch 240 is integrated with the radio 242 and is available as an off-the-shelf component, but integration is not required. The third client embodiment may also use the enhanced antenna system second embodiment to allow overlapping physical sectors; however, only one antenna may be enabled at a time.

The fourth client embodiment may be similar to the second client embodiment except, for example, the fourth client embodiment has four antennas instead of two. The fourth client embodiment has four antennas (232, 234, 236, and 238), one RF switch (240), one ASD (246), one attenuator (248), one radio (242), and the client (244), as shown in FIG. 31. The fourth client embodiment uses the enhanced antenna system sixth embodiment. In one embodiment, the sixth embodiment of the enhanced antenna system is arranged to provide about 360-degree coverage, but it is not required. The fourth client embodiment using the enhanced antenna system sixth embodiment may provide the coverage pattern shown in FIG. 16, or any other pattern of four non-overlapping physical sectors. The physical sectors are not required to be adjacent. The enhanced antenna system sixth embodiment also allows the fourth client embodiment to attenuate the receive signal to reduce interference from unwanted sources. In one embodiment, the RF switch 240, the ASD 246, and the attenuator 248 are integrated with the radio 242, but integration is not required. The attenuator may be of fixed or variable attenuation. In one embodiment, the attenuator is variable and controlled by the client on a per frame basis; however, the attenuator may also be controlled by the radio and use any algorithm or frequency of adjustment. The fourth client embodiment may alternately use the enhanced antenna system fourth embodiment to allow overlapping physical sectors; however, only one antenna may be enabled at a time.

As discussed, the invention may include off-the-shelf components to reduce cost, hasten development, speed production, and to ensure quality and reliability. Radios with integrated diversity switches are readily available and processor development boards are useful for software development platforms; however, the radios, processor board, antennas, horns and any other component must be integrated together to form the wireless cell. An exemplary method of integration is to develop a printed circuit board (PCB) to house the radios with any additional components such as attenuators. The radio board then couples to the processor board and to the antennas. Components such as I/O port and local memory may be incorporated into the processor board. The interface between the processor board and the radio PCB is generally not timing critical or sensitive to noise because the processor connects to the radios using an industry standard bus such as PCI, USB, PC Card, or IEEE 1394 depending on the radio interface bus. The wiring of the radio PCB; however, is highly sensitive because multiple radios and radio frequency cables are in close proximity. Radios may be placed in shield cans. The wires from the radios to the antennas or to the horns containing the antennas may be placed away from each other to reduce cross-talk and interference. Wires between components may be shielded.

Now turning to exemplary channel assignment methods. Radios transmit and receive through antennas using specific channels. A channel may consists of, for example, specific radio frequency or frequencies, encoding and decoding schemes, modulating and demodulating schemes, and other methods to enable a channel to send and receive information. When two radios transmit on the same channel in the same physical area, the transmissions interfere with each other. As mentioned earlier, some channels do not interfere or minimally interfere with each other when used in the same physical location. Multi-sector wireless cells, especially those that use overlapping physical sectors, may use minimally interfering channels to enable multiple radios to transmit and receive simultaneously in the same physical area with less interference. The number of channels needed to reduce interference between physical sectors depends on, for example, the number and arrangement of the physical sectors. Other factors that influence the assignment of channels may include, for example, the channels used by close, foreign wireless cells, multi-path interference, client transmit signal strength, reflected signals, signal attenuation behind the antenna, horn signal attenuation, antenna side lobes, and other factors.

In general, an exemplary approach to assigning channels is to assign minimally interfering channels to adjacent, non-overlapping physical sectors and to overlapping physical sectors. Several channel assignments may be possible for every wireless cell coverage pattern. It is also possible to use time multiplexing techniques to reduce interference between adjacent or overlapping physical sectors that for whatever reason use the same channel. Some options for assigning channels are discussed for both overlapping and non-overlapping wireless cell coverage patterns. Some examples apply to the hardware and enhanced antenna system embodiments disclosed. The assignment methods disclosed are not to be construed as a limitation on methods of assigning channels to wireless cell coverage patterns.

The diagrams showing exemplary channel assignments use the alphanumeric identifiers C1, C2, etc. to represent channels. The identifiers C1, C2, etc. do not represent a specific channel. Any channel may be assigned to the identifier C1, but the same channel is assigned to every physical sector labeled C1. While C1 and C2 do not necessarily represent specific channels, C1 represents a channel that may be different from and may be minimally interfering with the channel represented by C2. The same rules apply to all channel identifiers.

Several exemplary wireless cell coverage patterns and possible channel assignments are shown in FIG. 40 through FIG. 50. The examples are not exhaustive, but are representative of how channels may be assigned to reduce interference. The channel assignment shown in FIG. 40 may be used for three physical sectors, non-overlapping, about 360-degree wireless cell coverage. Using three channels as shown in FIG. 40 allows the radios attached to the antenna physical sectors 62, 64, and 66 to operate independently and simultaneously with minimal interference to each other. Another possible channel assignment may be to use C1 to provide time-multiplexed coverage of physical sectors 64 and 66. Under such a scheme, C2 operates continuously in physical sector 62 while C1 may operate exclusively for some period in physical sector 64 then operates exclusively in physical sector 66. C1 may also provide time-multiplexed coverage in all three sectors 62, 64, and 66.

Another potential channel assignment option is to assign the same channel to all three physical sectors 62, 64, and 66 shown in FIG. 40. Directional antennas or horns form the wireless coverage pattern shown in FIG. 40. As discussed above, directional antennas experience some attenuation between their operational center and the edge of their physical sector; therefore, even if adjacent physical sectors use the same channel, the attenuation of the signal at the edge of the physical sector may reduce the amount of interference between adjacent sectors. Increasing the amount of attenuation from the antenna's operational center to the physical sector edge may further decrease the interference between adjacent sectors that use the same channel.

The six physical non-overlapping sectors which form about 360-degree wireless cell coverage patterns in FIG. 41, FIG. 42, and FIG. 43 use two, three, and six minimally interfering channels, respectively. Clearly, other assignments that maintain different channels for adjacent physical sectors are possible such as modifying the channel assignments of FIG. 42 such that C1, C2, C3, C2, C1, and C3 are assigned to physical sectors 282, 284, 286, 276, 278 and 280 respectively. As mentioned above, time-multiplexed techniques or antenna attenuation characteristics may decrease the number of channels used while still reducing interference between adjacent physical sectors.

The non-overlapping wireless cell coverage patterns shown in FIG. 44, FIG. 45, FIG. 46, FIG. 47, and FIG. 48 use similar principles to assign channels to coverage patterns less than 360 degrees. The patterns shown may be varied while still maintaining different channels in adjacent physical sectors. Time-multiplexing and antenna characteristics may reduce the number of channels used. The pattern shown in FIG. 49 may use the same channel for both physical sectors because they are not adjacent and the directional antenna characteristics help reduce interference between the physical sectors. Two different channels may also be used. The channel assigned to an isolated physical sector, as shown in FIG. 50, does not have to consider adjacent physical sectors but must still consider the other factors mentioned above such as channel assignment of foreign wireless cells, multipath interference, etc.

Figure 51:
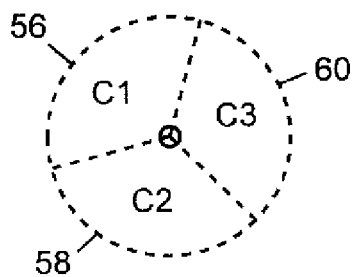
FIG. 51 is a diagram of an exemplary wireless cell formed using three, adjacent, non-overlapping physical sectors providing about 360-degree coverage and having a channel assigned to each physical sector.
Figure 52:
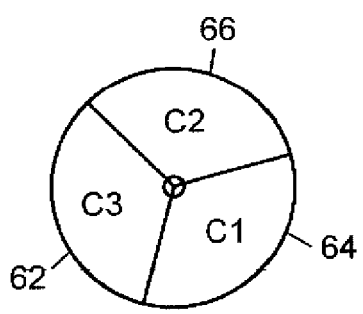
FIG. 52 is a diagram of an exemplary wireless cell formed using three, adjacent, non-overlapping physical sectors providing about 360-degree coverage with orientation different than the wireless cell shown in FIG. 51 and having a channel assigned to each physical sector.

An exemplary approach to assigning channels to coverage patterns that have overlapping physical sectors is to assign different, minimally interfering, channels to adjacent physical sectors and to overlapping physical sectors. An example of assigning three channels to a six physical sectors, six virtual sectors, about 360-degree wireless coverage pattern is shown in FIG. 51, FIG. 52, and FIG. 53. The six physical sectors are shown in two groups of three non-overlapping physical sectors in FIG. 51 and FIG. 52. Each adjacent physical sector is assigned a different channel to minimize interference. In one embodiment, the physical sectors are the same or similar size and oriented such that each physical sector substantially equally overlaps two adjacent physical sectors. Various overlap and physical sector size schemes are possible; however, using physical sectors of substantially equal size and overlapping by about 50% provides symmetry, substantially equally sized virtual sectors, and positions the operational center of an antenna over the edges of two adjacent physical sectors. Superimposing the physical sectors of FIG. 51 and FIG. 52 while maintaining their respective orientations results in the overlapping wireless cell coverage pattern shown in FIG. 53. No overlapping physical sector has the same channel as the physical sectors it overlaps. Each virtual sector receives coverage from two different channels.

Figure 54:
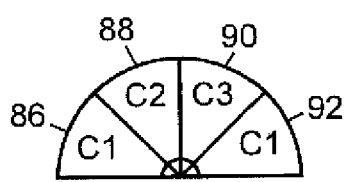
FIG. 54 is a diagram of an exemplary wireless cell formed using four, adjacent, non-overlapping physical sectors providing about 180-degree coverage and having a channel assigned to each physical sector.
Figure 55:
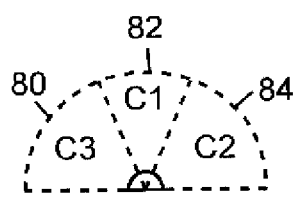
FIG. 55 is a diagram of an exemplary wireless cell formed using three, adjacent, non-overlapping physical sectors providing about 180-degree coverage with orientation different than the wireless cell shown in FIG. 54 and having a channel assigned to each physical sector.

The same approach may be used for wireless coverage patterns less than about 360 degrees. FIG. 54 and FIG. 55 show non-overlapping coverage patterns and channel assignments, that when superimposed, form the overlapping wireless coverage pattern shown in FIG. 56. Adjacent physical and overlapping physical sectors may include different, minimally interfering, channels assigned while each virtual sector is covered by two radios using different channels. Physical sectors may not be limited to similar size as mentioned above and as shown in FIG. 55.

Figure 56:
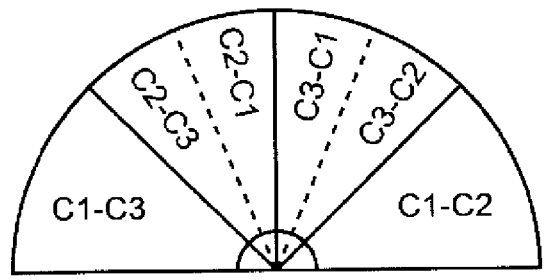
FIG. 56 is a diagram of an exemplary wireless cell formed using seven overlapping physical sectors that form six virtual sectors.

The channel assignments shown in FIG. 53 and FIG. 56 are two embodiments of many potential channel assignments. Many combinations of channel assignments exist that produce an exemplary situation where adjacent and overlapping sectors use different channels.

While it is possible for adjacent physical sectors to use the same channel and rely on antenna characteristics or placement to minimize interference, overlapping physical sectors may be not assigned the same channel. It may be possible to assign physical sectors 56, 58, and 60 of FIG. 51 to the same channel and physical sectors 62, 64, and 66 of FIG. 52 to a different channel and still reasonably limit interference between adjacent physical sectors through antennas characteristics and placement. Time-multiplexing techniques also allow any number of channels to provide coverage with minimal interference.

The hardware shown in FIG. 22, FIG. 23, or FIG. 24 may produce the wireless coverage pattern and channel assignments shown in FIG. 53 by using the second, fourth, and fifth enhanced antenna embodiments respectively. Each radio 136, 138, and 140 is set to a channel. The antennas may need angle of coverage of approximately 120 degrees. The pattern of FIG. 53 may be achieved by positioning the antennas attached to a radio so that the operational centers of their physical sectors are substantially diametrically opposed. For example, if radio 136, 138, and 140 are set to channels C1, C2, and C3 respectively, antennas 118 and 120 may be assigned to substantially correspond to physical sectors 56 and 64, antennas 122 and 124 to substantially correspond to physical sectors 58 and 66, and antennas 126 and 128 to substantially correspond to physical sectors 60 and 62. Other variations of radio channel assignments and antenna physical sector positioning exist.

The hardware shown in FIG. 22, FIG. 23, or FIG. 24 may also produce the wireless cell coverage pattern shown in FIG. 42. The hardware in FIG. 23 and FIG. 24 may use the sixth and fifth enhanced antennas system embodiments respectively. The antennas may need an angle of coverage of approximately 60 degrees. If radio 136, 138, and 140 are set to channels C1, C2, and C3 respectively, antennas 118 and 120 may be positioned to substantially correspond to physical sectors 276 and 282, antennas 122 and 128 to substantially correspond to physical sectors 278 and 284, and antennas 126 and 128 to substantially correspond to physical sectors 280 and 286. Other variations of radio channel assignments and antenna physical sector positioning exist.

Using the same approach, the hardware of FIG. 25, FIG. 26, or FIG. 27 may produce the wireless cell coverage pattern and channel assignment of FIG. 44. The hardware in FIG. 26 and FIG. 27 may use the sixth and fifth enhanced antenna system embodiments, respectively. A hardware configuration where a radio attaches to three antennas through an RF switch may produce the coverage and channel assignment of FIG. 41. The pattern shown in FIG. 43 may be produced by hardware, wherein for example, six radios may each service their own single antenna, or six radios may connect to six antennas through an RF switch. The wireless cell pattern and channel assignment of FIG. 56 may be produced by hardware where one radio supports three antennas and two other radios each support two antennas, or by hardware where seven radios are each attached to one antenna, or by hardware where four radios each support two antennas, but one of the antennas is not used. The wireless cell coverage patterns, channel assignments, and hardware are merely a few examples of many possible variations.

Now turning to exemplary methods of use. Signal quality is a term used to describe radio signals wherein higher quality signals typically more accurately transmit and receive information, and provide higher data transfer rates (i.e., throughput). In contrast, lower quality signals potentially suffer losses in transmission and reception; thereby resulting in low throughput. Signal quality is a measure of, for example, signal level, noise level, error rate, and other operational and environmental factors from a radio's perspective. Each radio manufacturer determines a proprietary measure of signal quality and assigns a relative number. Most manufacturers determine signal quality in a different way, so the quality numbers from different radio manufacturers often cannot be meaningfully compared to each other. The signal quality of radios from the same manufacturer may be compared to determine which radio receives the highest or lowest quality signal, wherein such signal quality may be determined for each channel available.

A radio may perform a signal quality scan by listening to receive signals and ranking them by their signal quality. Radios may be capable of using more than one channel scan and ranking all signals received on all channels. In one embodiment, a signal quality scan may be used by wireless cells, clients and other wireless devices to detect foreign wireless cells, access points, clients or other wireless devices.

A wireless cell may perform a traffic load scan by setting its radios into the receive mode and counting the number of frames or the amount of traffic sent by foreign wireless cells on all possible channels. A traffic scan reveals the traffic load on each channel and the signal quality of the channels used by the detected foreign wireless cells. Traffic load information may be used when assigning channels to physical sectors. In one embodiment, the channel assigned to a specific physical sector is one where the foreign wireless cell traffic load and signal quality is low.

Wireless communication typically cannot take place between a wireless cell and a client until a relationship is established. In the simplest setting, a client requests to associate with a wireless cell, and if the wireless cell grants the association, a relationship is established and communication may occur. A client may not only associate with the wireless cell, but also with a specific physical sector of the wireless cell. Client CL3 in FIG. 57 detects radio signals from physical sectors 288, 290, 292, and possibly from 294. Client CL3 makes a request to associate with one of the physical sectors 288, 290, 292, or 294, generally based on the quality of the signal CL3 receives from each sector. The wireless cell 296 may either accepts or denies the request. If the request is denied, client CL3 may request association with a different sector. The process may continue until client CL3 either associates with a physical sector of wireless cell 296 or until all requests are denied. Wireless cell 296 may track the clients serviced by each physical sector.

The wireless cell may deny client association with one physical sector in preference of another physical sector to balance the loading and/or to improve the data transfer rates of the clients among the physical sectors. Client CL3 in FIG. 57 will most likely associate with and be serviced by physical sector 290; however, a reflection of the signal from physical sector 294 may provide the best signal quality and client CL3 may seek to instead associate with, for example, physical sector 294. Although environmental conditions may affect the association and servicing of clients, increasing the number of physical sectors of a wireless cell generally increases the number of association and load balancing possibilities.

Figure 58:
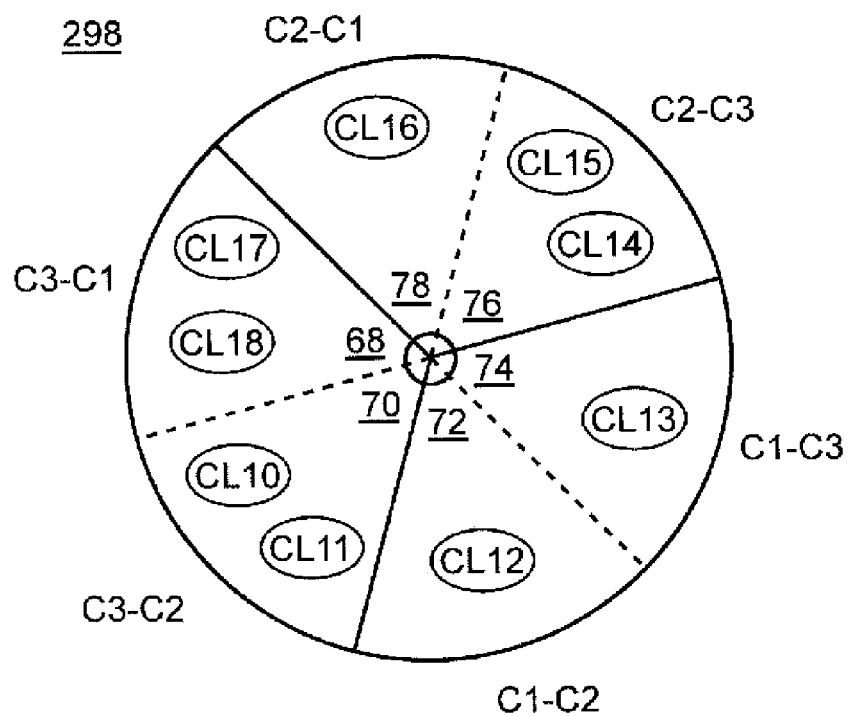
FIG. 58 is a diagram of an exemplary wireless cell with six overlapping physical sectors providing about 360-degree coverage and servicing clients.

Overlapping physical sectors provide additional association and load balancing options. Referring to FIG. 14 and FIG. 58 together, client CL12 lies within physical sectors 64 and 58, which is also labeled as virtual sector 72. The wireless cell may balance its load by denying client CL12 association with physical sector 58, but by accepting association with physical sector 64; thereby leaving physical sector 58 to help service clients CL10, and/or CL11. Wireless cell 298 may spread the load of CL10, CL11, CL17, and CL18 between physical sectors 58, 62, and 56.

Simple clients may be capable of associating. Advanced clients may send information to the wireless cell during the association process. An advanced client may report, for example, at least one of its desired minimum and maximum throughput needs, desired channel, signal quality for all channels, all detectable wireless cells and physical sectors, physical distance to all wireless cells, local storage capacity, additional available communication protocols, ability to physically move, or any other information useful to the wireless cell in servicing the client. Exemplary protocols for simple clients are the 802.11 communications protocols.

The channel used between the wireless cell and the client may also be established at association. The wireless cell may change the channels assigned to its physical sectors in response to, for example, interference, loading, throughput demands, or other factors. In one embodiment, when the wireless cell changes the channel used in a physical sector, all clients associated with the physical sector detected, and follow to the new channel. Advanced clients may be capable of either negotiating the use of a different channel, or providing the wireless cell with signal quality information from each client's perspective to assist the wireless cell in determining the best channels to use.

A wireless cell may dynamically balance its load by disassociating a particular client with a particular physical sector and accepting an association with a different sector, or the wireless cell may use control commands to move an advanced client to a different physical sector and different channel without requiring the client to repeat the association process. A client may disassociate with its current physical sector and request association with another physical sector of the same wireless cell, but in one embodiment, the wireless cell approves the new association request.

Figure 61:
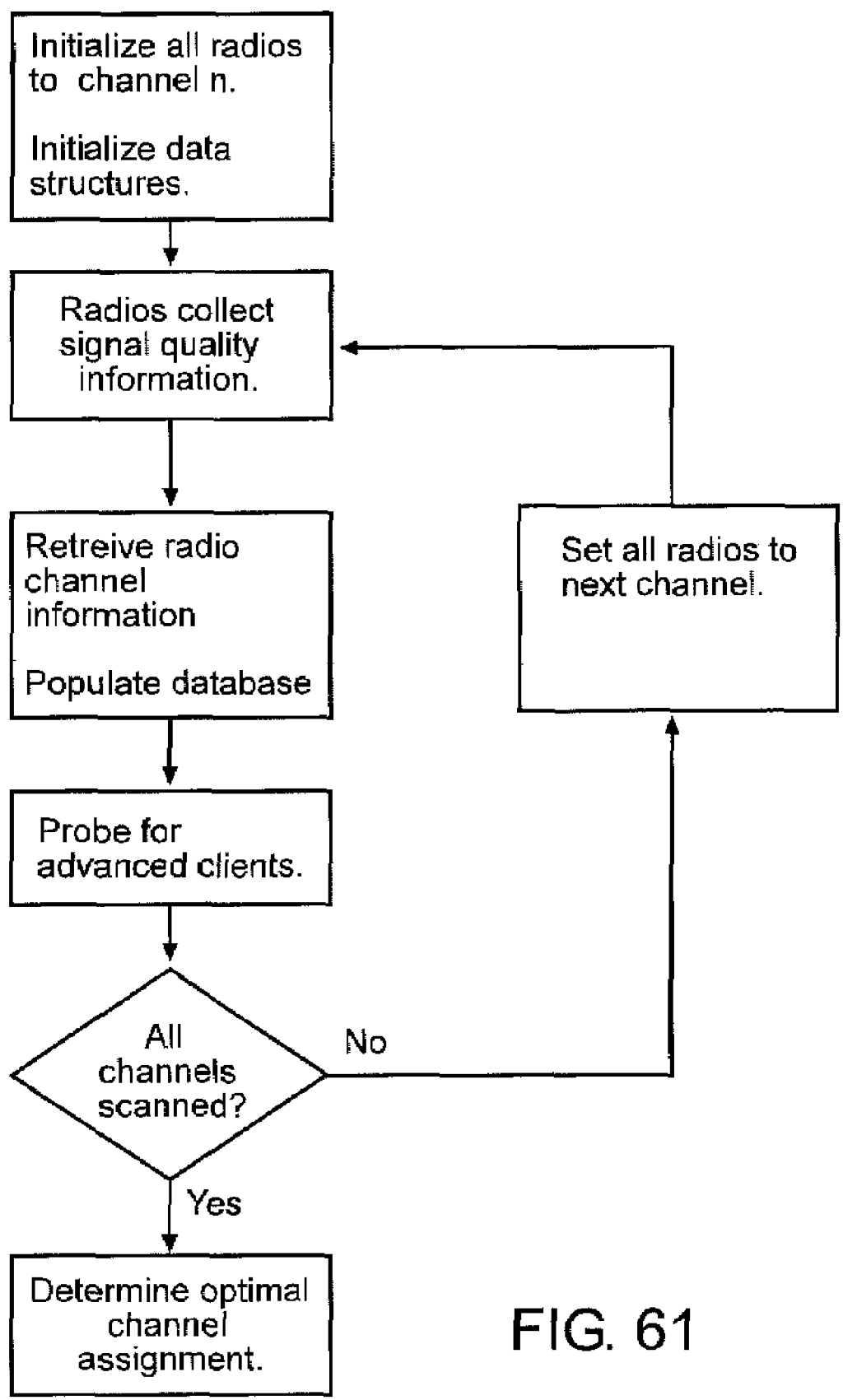
FIG. 61 is a flow chart of a method for performing an exemplary active scan.

During an active scan, the wireless cell scans all or most channels on all or most radios and through all or most antennas. Active scans may perform both signal quality and traffic load scans, and may detect all or most active, foreign wireless cells operating on any channel. An active scan may disrupt transmission and reception of normal data and control information with associated clients that is in progress. Active scans may be performed at initialization or when a radio is inactive for a predetermine amount of time. One method of performing an active scan is shown in FIG. 61 in which all radios are set to the same channel simultaneously and allowed to collect signal quality information. The signal quality collected from each radio may be used to determine potential channel assignments for each radio to substantially comply with throughput, or loading specifications.

A passive scan may not disrupt transmission and reception of normal data and control information. Passive scans are often performed on a radio between data transmission and reception and may be limited to the channel in use by the radio. Passive scans may also perform both signal quality and traffic load scans. Generally, the radio may continuously perform passive scans collecting information such as wireless cell identification numbers, frame received, and frames transmitted. As permitted by the communication protocol and loading, the processor polls the radio to read the information the radio collects during its passive scans. Passive scans also detect any newly active foreign wireless cells operating on the same channel as the scanning radio that were not detected during the most recent active scan.

When using exemplary communication protocols, 802.11, new foreign access points may be detected when the new access point sends its beacon.

Figure 57:
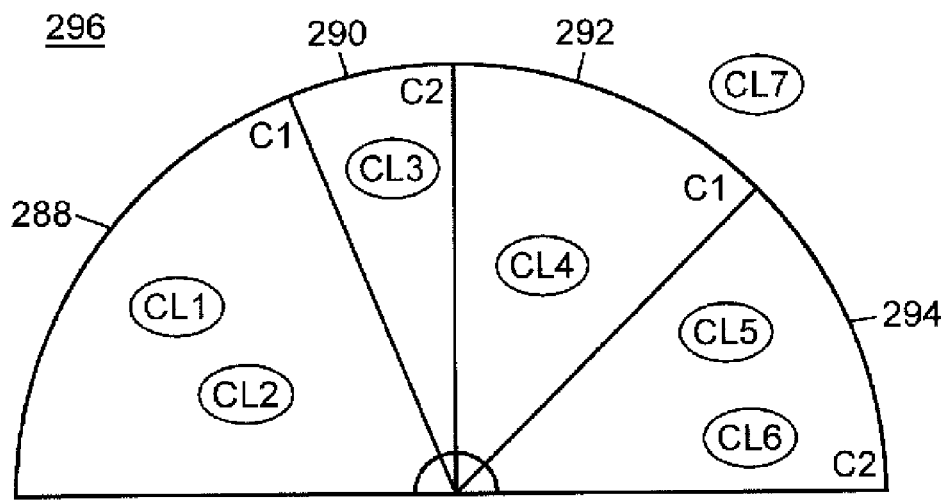
FIG. 57 is a diagram of an exemplary wireless cell with four non-overlapping physical sectors providing about 180-degree coverage and servicing clients.

The operation of a wireless cell and the method in which it services clients may depend on, for example, at least one of the number of radios, number of antennas, arrangement of antenna physical sectors, hardware components and organization, detectable foreign wireless cells, number of clients, client throughput demand, and a variety of other factors. An exemplary operating scenario is shown in FIG. 57. For this example, assume the non-overlapping wireless cell 296 coverage pattern shown in FIG. 57 is produced using the hardware shown in FIG. 26. Physical sectors of antennas 180, 182, 184, and 186 substantially correspond to physical sector positions 288, 292, 290, and 294 respectively. Radio 192 services physical sectors 288 and 292 through antennas 180 and 182 respectively and is set to channel C1. Radio 194 services physical sectors 290 and 294 through antennas 184 and 186 respectively and is set to channel C2. Clients CL1 and CL2 are associated with and serviced by radio 192 through antenna 180 that forms physical sector 288. Clients CL4 is associated with and serviced by radio 192 through antenna 182 that forms physical sector 292. Client CL3 is associated with and serviced by radio 194 through antenna 184 that forms physical sector 290. Clients CL5 and CL6 are associated with and serviced by radio 194 through antenna 186 that forms physical sector 294. Client CL7 is not associated with any physical sector of wireless cell 296, but transmissions from CL7 are detectable by the wireless cell. Assume for the example that CL7 transmits on channel C1 with a signal of the same quality and strength as client CL4.

Radio 192 may not simultaneously service physical sectors 288 and 292. The same may apply to radio 194 and physical sectors 290 and 294. Therefore, the wireless cell 296 may simultaneously service one client from the group of clients CL1, CL2, and CL4 and one client from the group of clients CL3, CL5, and CL6. For example, client CL3 may transmit while CL4 simultaneously receives. If CL1 wants to send data to CL2, wireless cell 296 must first receive the data from CL1, store it locally, and then forward it to client CL2. The communication protocol used may determine how data is packaged for transmission and reception. Exemplary communication protocols may use packets or frames, which allow the radios to service client demand in manageable, discrete chunks. Any algorithm may be used to control switching the radio between the sectors such as time multiplexing, past client demand, expected client demand, or throughput allocation. In one embodiment, the radios passively scan their respective physical sectors through the appropriate antenna to detect and service client communications requests.

Although client CL7, in FIG. 57, may not be associated with any physical sector or either radio 192 or 194, transmissions from CL7 interfere with CL4 and possibly CL1 and CL2. The hardware shown in FIG. 26 is equipped with an attenuator in the receive path of either radio. Increasing the attenuation of attenuator 206 each time radio 192 services physical sector 292 may reduce the interference of CL7. Increasing the attenuation decreases the received signal strength of both CL4 and CL7; however, if CL4 and CL7 transmit with the same signal quality and strength, the signal from CL7 may be attenuated more than the signal from CL4 because CL7 is farther away. The attenuator is set to a level where CL7 interference is negligible, yet the signal from CL4 is still reliably received. In one embodiment, the attenuator may be controlled on a per packet or frame basis, thereby allowing the processor or the radio to increase the attenuation factor only when servicing client CL4 in physical sector 292.

Similar to the non-overlapping wireless cell described above, the operation of an overlapping wireless cell depends on many factors, but the virtual sectors formed by overlapping physical sectors may improve performance and flexibility because each virtual sector may be serviced by at least two independent radios. A potential operating scenario for an overlapping wireless cell is shown in FIG. 58. Assume for this example that the overlapping wireless cell coverage pattern of FIG. 58 is produced using the hardware shown in FIG. 22. Referring also to FIG. 53, physical sectors of antennas 118, 120, 122, 124, 126, and 128 substantially correspond to physical sector positions 56, 64, 58, 66, 60, and 62. Therefore, radio 136 uses channel C1 and services virtual sectors 68, 72, 74, and 78. Radio 138 uses channel C2 and services virtual sectors 70, 72, 76, and 78. Radio 140 uses channel C3 and services virtual sectors 68, 70, 74, and 76.

A notable difference between an overlapping and non-overlapping wireless coverage pattern is that each client may potentially, depending on channel assignments, associate with one of at least two radios. If a virtual sector is formed by more than two overlapping physical sectors, a client may potentially associate with one of many radios. In the scenario of FIG. 58 and when the hardware of FIG. 22 is used, each client of wireless cell 298 may associate with one of two radios that service each virtual sector. The combinations of client-to-radio associations are numerous; however, any two clients in a virtual sector may associate with and be serviced by different radios, which means that two clients in any virtual sector may be serviced simultaneously. For example, assume client CL10 associates with radio 138 using channel C2 while client CL11 associates with radio 140 using channel C3. Because the channels are different and minimally interfering, CL10 and CL11, which are in the same virtual sector, may communicate to each other or to other devices simultaneously.

As with the non-overlapping example given above, the hardware configuration of FIG. 22 may be utilized such that, each radio may service only one physical sector, which translates to one virtual sector, at a time. Therefore, while radio 138 services a client in virtual sector 70, it may not be servicing clients in virtual sectors 72, 76, or 78. Communications between virtual sectors may occur simultaneously if the clients are serviced by different radios, but communications between clients serviced by the same radio must occur sequentially instead of simultaneously. For example, if client CL17 and CL13 are both associated to radio 136, communications between them must occur sequentially. If, at the same time, client CL18 is associated with radio 140, communications between CL18 and CL13 may occur simultaneously.

In one embodiment, the radios passively scan their respective physical sectors to detect and service client communications requests. An exemplary communication algorithm may include an algorithm that uses packets or frames, thereby allowing the wireless cell to efficiently manage client requests for service.

Figure 59:
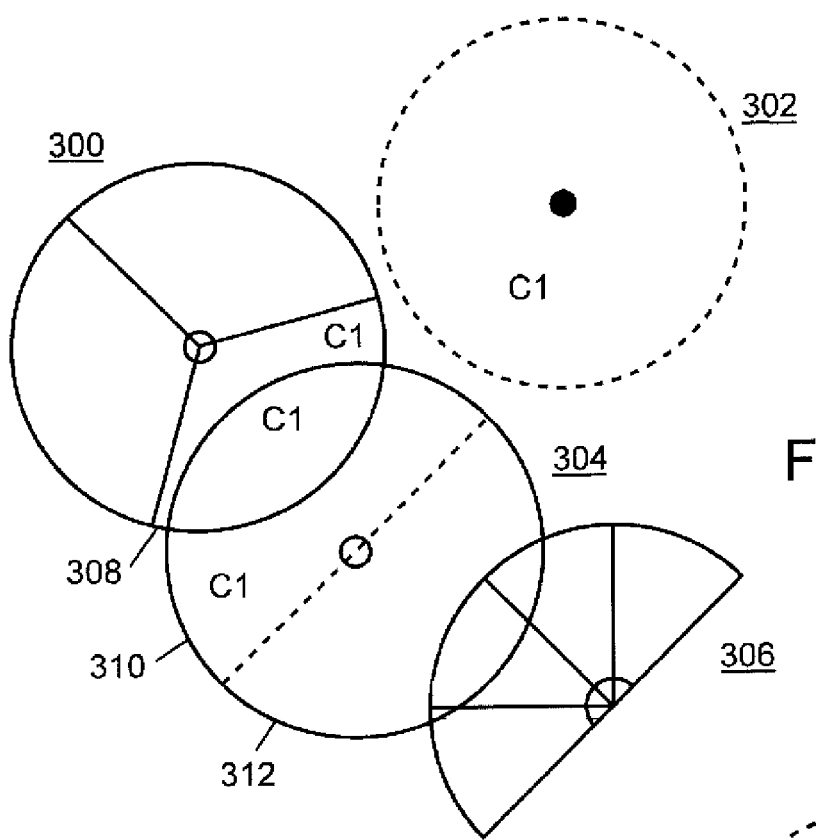
FIG. 59 is a diagram of an exemplary client using a two-antenna, client enhanced antenna system placed in an environment of three foreign wireless cells.

Although many factors affect communication between a wireless cell and a client, a client with an enhanced antenna system may disable antennas or adjust receive attenuation to better cope with interference. FIG. 59 shows three exemplary wireless cells 300, 302, and 306, which are foreign to each other, and an exemplary two-sector client 304. Assume client 304 uses the second client embodiment as shown in FIG. 30. For the situation shown in FIG. 59, assume that sector 308 of wireless cell 300 uses channel C1 and provides the highest quality signal possible to client 304. Assume also that omni-directional wireless cell 302 and a physical sector of wireless cell 306 also provide strong signals on channel C1, but they may not be as strong as the signal from wireless cell 300 as perceived by client 304. In this example, the client 304 elects to use the highest quality signal it perceives and therefore associates with wireless cell 300. Using the enhanced antenna approach disclosed for clients, client 304, disables the antenna servicing physical sector 312. The antenna servicing physical sector 310 may be directional and attenuates signals from behind; therefore, disabling the antenna servicing physical sector 312 immediately reduces the effect of radio signals from wireless cell 306 on client 304. The client 304 may reduce the effects of interference from wireless cell 302 by increasing the amount of attenuation in its receive path. Increasing the attenuation decreases the receive signal strength of the signals from both wireless cells 300 and 302; however, the signal from 300 is higher quality and stronger than the signal from 302, so client 304 increases attenuation until interference from wireless cell 302 is negligible while at the same time the signal from wireless cell 300 is still intelligible.

In another example, referring to FIG. 59, assume client 304 desires to associate with exemplary cell 306. Assume also that exemplary cell 300 provides, as in the last example, the highest quality signal. In such a situation, physical sector 312 of wireless cell 304 may associate with a sector of wireless 306 even though wireless cell 300 may offer a higher quality signal. Once wireless cell 304 associates with wireless cell 306, wireless cell 304 may disable physical sector 310 to disable interference from wireless cells 300 and/or wireless cell 302.

Figure 60:
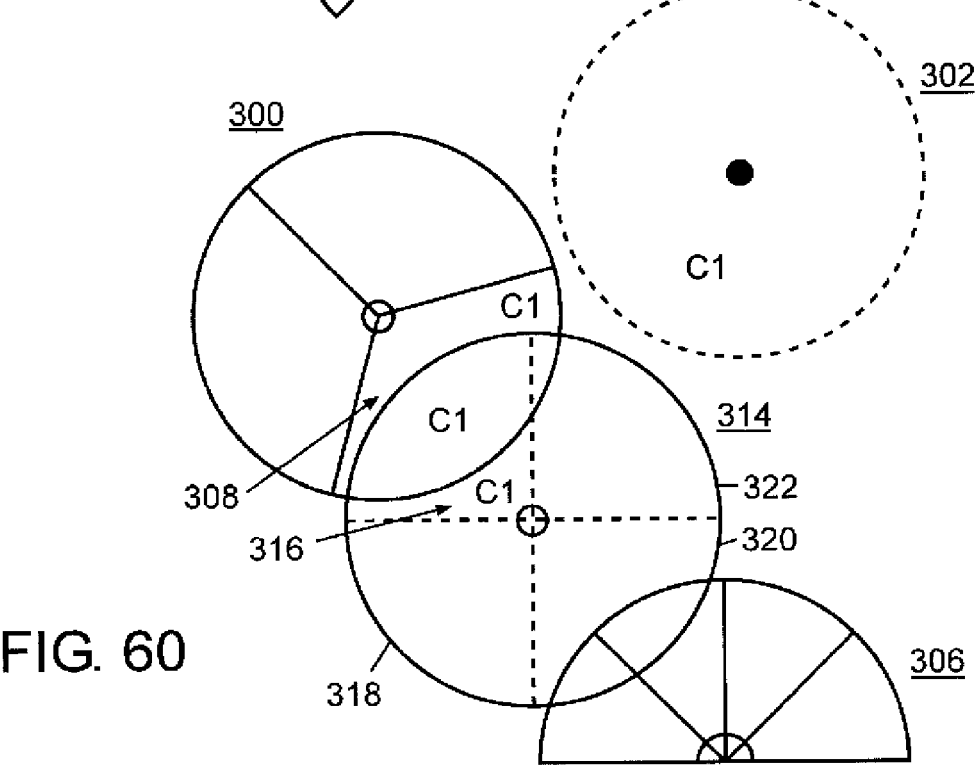
FIG. 60 is a diagram of an exemplary client using a four-antenna, client enhanced antenna system placed in an environment of three foreign wireless cells.

Assume a similar situation applies in FIG. 60 as described for FIG. 59 except that, for example, the client 314 is implemented using the third client embodiment as shown in FIG. 29. As above, the client 314 elects to associate with wireless cell 300 because it provides the highest quality signal. Client 314 then disables the antennas servicing physical sectors 318, 320, and 322; thereby reducing the interference from wireless cells 306 and 302. Interference from wireless cell 302 is reduced due to the directional characteristics of the antenna servicing physical sector 316 and not through attenuation in the client receive path. The increased number of sectors in client 314, over client 304, provides client 314 with more options when dealing with interference. Client 314 may also be implemented using client embodiment four, as depicted in FIG. 31, which may allow the client to adjust the attenuator to further cope with interference from wireless cell 302. Client embodiments have no limit on the number of antennas.

After the client associates with a wireless cell and disables the unused antennas, it may occasionally scan all antennas to determine if a higher quality signal has become available from another wireless cell. An elapse of time, loss, or deterioration of signal, or any other event such as a change in position of the client may also trigger scanning through the disabled antennas. If a scan reveals a higher quality signal, the client may associate with the wireless cell providing the better signal, disable the antennas not in use, and possibly readjust the attenuator. During the scan, the attenuation of the attenuator may be decreased to zero.

As discussed above when discussing client association, clients may have valuable information to share with the wireless cell. Advanced clients may report such information as, for example, desired minimum and maximum throughput needs, desired channel, signal quality for all channels, other detected wireless cells or physical sectors, physical distance to all wireless cells, local storage capacity, additional available communication protocols, ability to move, active or passive scan results, local storage fullness levels of empty, full, high water mark or low water mark, current channel signal quality, request for channel change or other environmental, and/or operational information. In turn, the wireless cell may send information or commands to advanced clients to facilitate, for example, changing channels, changing protocols, authenticating the client, requesting signal quality information from the client perspective, moving a client to another physical sector, and/or any other type of action. Communication of control or environmental information between a wireless cell and advanced clients may occur at association, during active or passive scans, or at any time allowed by the communication protocol.

Throughput load management may be considered a step beyond load management described above. Throughput load management attempts to assign resources according to client throughput specifications. The wireless cell determines each client's desired throughput by, for example, at least one of direct user input, polling during active or passive scan, look up preprogrammed information, monitoring traffic during operation, and/or any other means. In addition to client throughput, each client may provide the wireless cell with a prioritized list of optimal channels from the clients' perspective. The wireless cell then determines the optimal way to meet all client needs using the available resources.

An exemplary division of resources may assign one high throughput client per radio using its optimal channel. In another embodiment, lower throughput clients may be assigned to the same radio as a high throughput client, but receive lower priority service. Another approach is to service as many low throughput clients as possible with a single radio; thereby leaving the other radios available to service high throughput clients. As discussed above in the section on client association, if a change of conditions include the wireless cell to change the channels used in any physical sector, the clients follow the channel change.

The wireless cell may use the passive scan or any other means to communicate with each client to ensure that each client has its throughput demands fulfilled. In one embodiment, each client includes a local buffer and may communicate levels of buffer capacity to the wireless cell. The size of the buffer is dependant on the link quality, and may either be statically allocated (e.g., 500-1000 frames) or dynamically allocated, so that the buffer size grows as the link quality decreases. When client demand is not met, the wireless cell may, for example, at least one of scan for channels with higher quality signal capable of providing higher throughput, poll the clients to determine if throughput needs have change, change channels to attempt improvement in data throughput, and determine how to assign resources to meet throughput specifications. Any changes in channel, association, or hardware assignments are then implemented. In the situation where a wireless cell streams video to a client with a local buffer, changing channel may not affect the video stream because the local buffer may receive a retransmission of the affected frames before they are desired for display.

A wireless cell may use any or all of the techniques discussed above to increase the success of streaming video in addition to servicing other clients. The wireless cell may perform, for example, an active scan to determine signal quality for each channel, sources of interference, the presence of foreign wireless cells or access points, and any other potential environmental information. The wireless cell then determines, for example, at least one of the number of clients that want to associate, each client's throughput specifications, which physical sectors may service each client, the best channels for each client, and other client related information. The wireless client may gather any environmental, system, or performance information from each client such as, for example, at least one of channel signal quality from the perspective of the client, buffer size, desired channel, and any other information available from the client. The wireless cell performs its load and throughput-load calculations, allocates resources, allows, or commands the clients to associate, then starts operation. The wireless cell may continually monitor the channels, clients, and other factors, such as buffer capacity levels of each client, during operation to determine if throughput specifications are being met. If throughput needs are not being met, the steps described above may be implemented.

Figure 62:
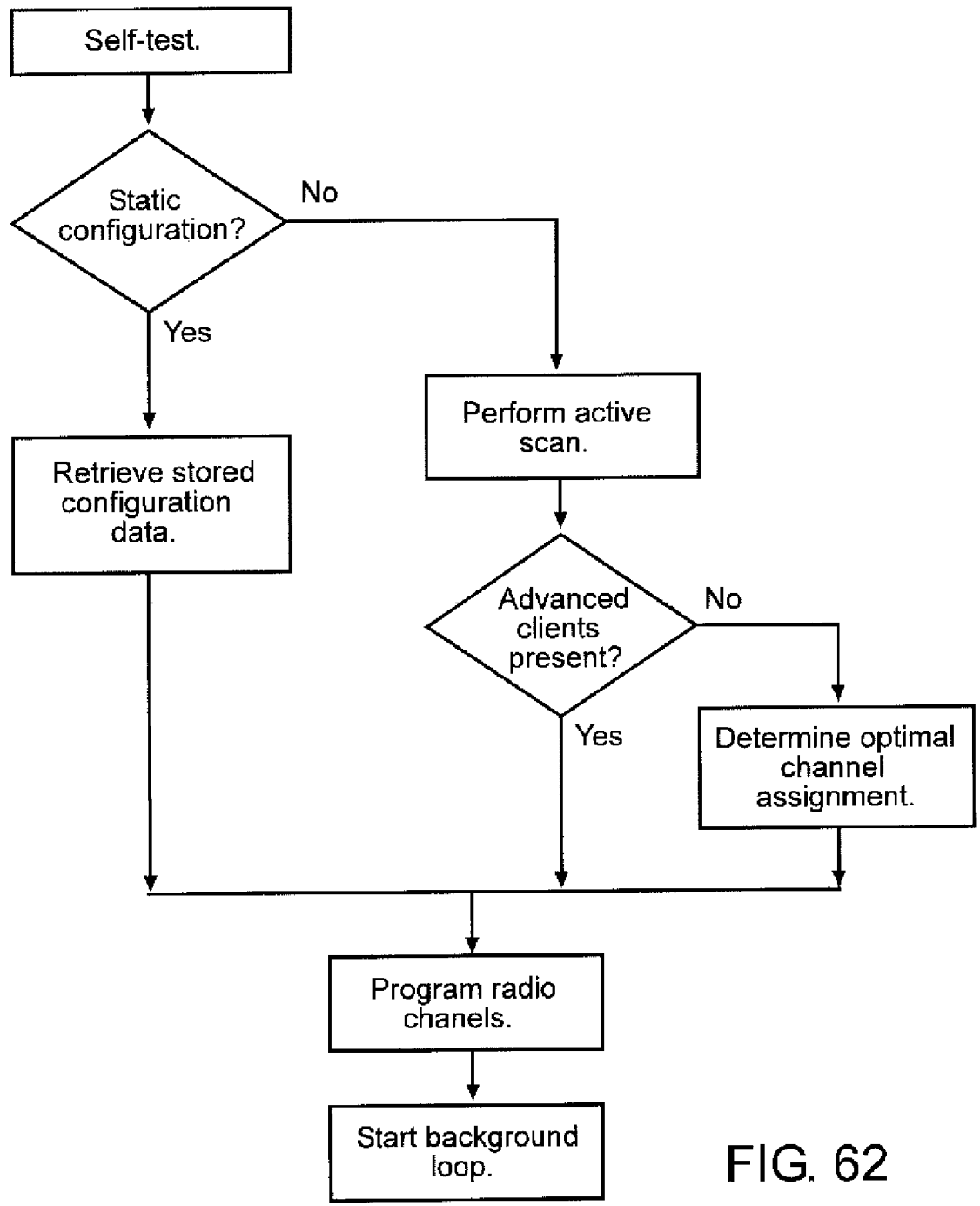
FIG. 62 is a flow chart of a method for performing an exemplary power on initialization.

Wireless cells may be configured to work in either a static or dynamic mode as depicted in FIG. 62. In the static mode, a wireless cell may be manually configured and/or load a stored configuration. The static mode function may not allow the wireless cell to change channels or configuration to adapt to changes in clients, environment, or throughput specifications. A wireless cell in the static mode includes similar capabilities as a current 802.11 access point. In one embodiment, the static mode loads a stored configuration, sets the channels according to the configuration, then enters the background loop. In the dynamic mode, in one embodiment, the wireless cell performs an active scan to determine which channels will provide the best performance, loading, or data throughput. After the active scan, the wireless cell checks for advanced clients. If advanced clients are not found, the wireless cell determines the optional channel for each radio, sets the channel for each radio then enters the background loop. If advanced clients are present, the radio channels are set using the data gathered during the active scan. The advanced clients may communicate with the wireless cell and request a channel change if the assigned channel does not provide the throughput the client desires.

Figure 63:
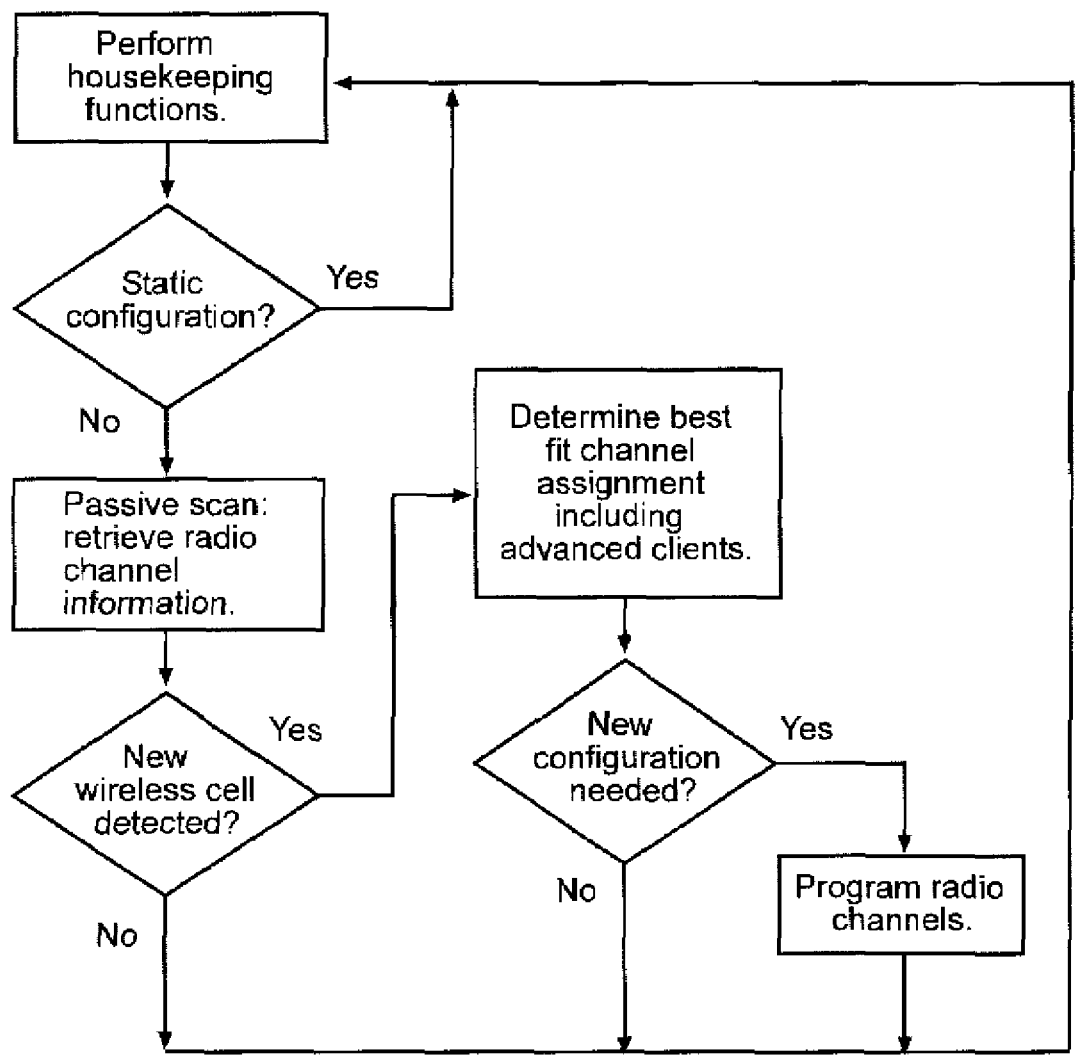
FIG. 63 is a flow chart of a method for performing an exemplary background loop.

The background loop includes the functions which the wireless cell continuously performs or the conditions continuously checked. A possible background loop is shown in FIG. 63. Similar to the power on initialization, the background loop may operate in either a static or dynamic mode. In the static mode, a wireless cell includes similar capabilities as a current 802.11 access point. In the static mode, the wireless cell may continuously perform the housekeeping functions to service simple clients. In the dynamic mode, the wireless cell may perform passive scans to check for new clients or other wireless cells. All new clients are added and serviced. Detection of a new wireless cell may cause the background loop to assess the impact the new cell has on the radio channels in current use. If the channel used by the newly discovered foreign wireless cell collides with the current channels in use, the background loop may reassess which channels are best. If a change in channels is needed, the appropriate radios may be set to a new channel. If a new configuration is not needed, or will not provide better performance, balance, or throughput, no change may be implemented.

Figure 64:
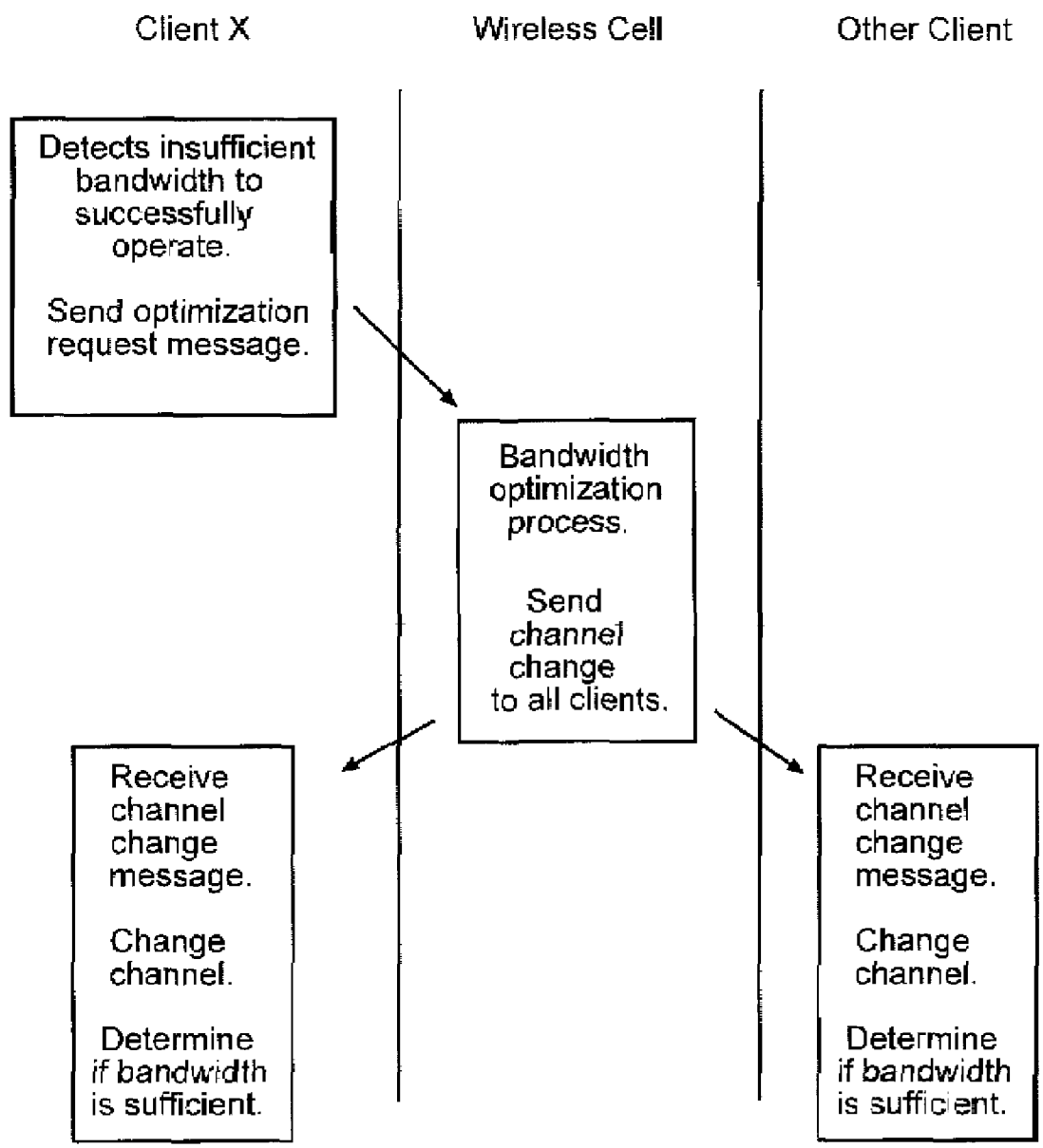
FIG. 64 is a flow chart of an exemplary method for a client to inform the wireless cell that the throughput of the assigned channel is insufficient.

As described above, advanced clients are capable of communicating with the wireless cell. The diagrams shown in FIG. 64 through FIG. 68 show some of the types of messages that may be sent between an advanced client and the wireless cell. Each figure shows the communications between Client X, the Wireless Cell, and Other Client. Other Client may represent one or more clients. In one embodiment, when Client X discovers it is not receiving the throughput to operate, as shown in FIG. 64, it sends a request to the Wireless Cell to get a channel that may be capable of delivering the throughput. The Wireless Cell receives the optimization request message, and uses the data collected during either a passive or active scan to determine if there is a channel that has less loading or interference that may possibly deliver greater throughput to Client X. If a channel is found, a channel change message is sent to all clients. Client X and all Other Clients receive the channel change message, change to their newly assigned channels, then determine if the new channel provides the throughput for operation.

Figure 65:
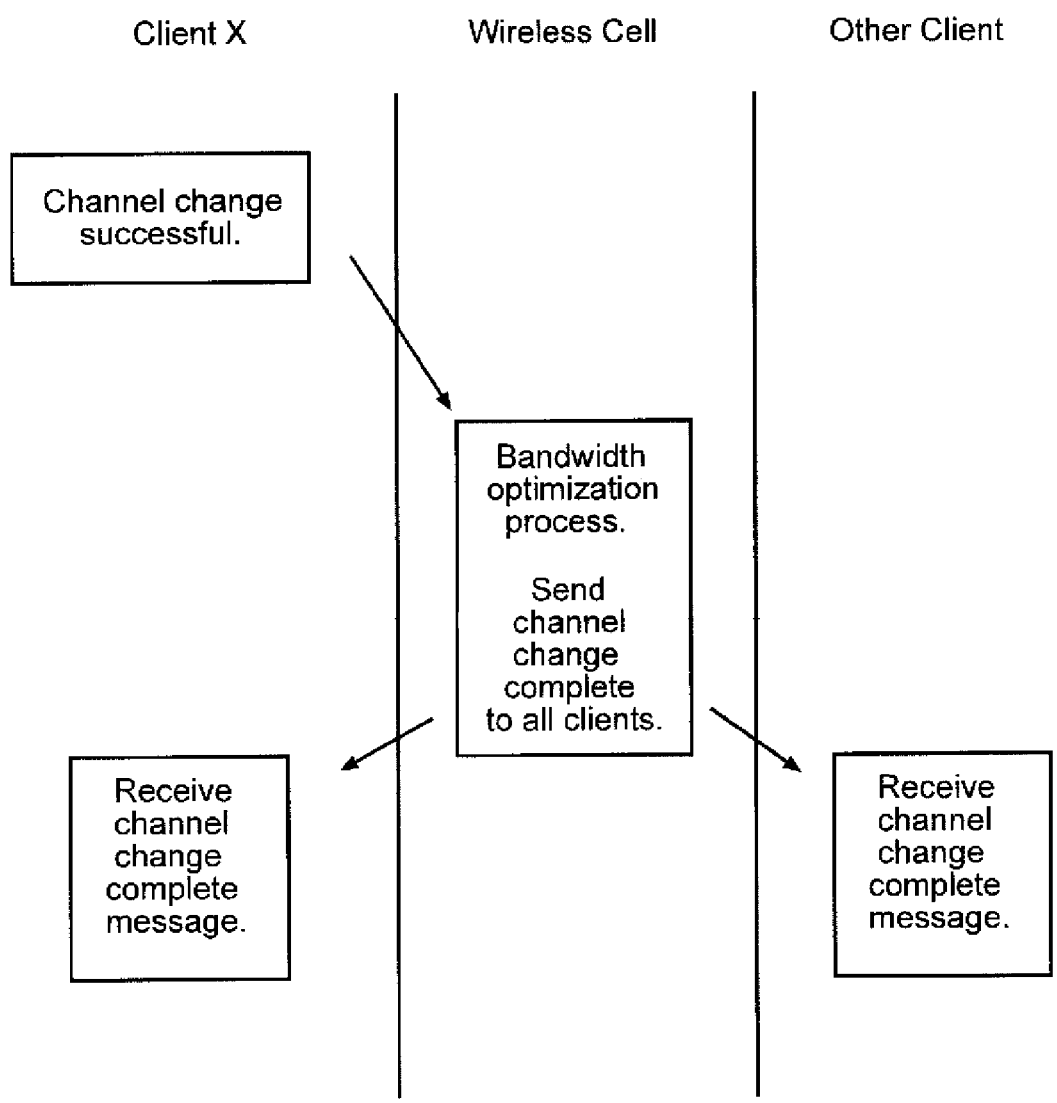
FIG. 65 is a flow chart of an exemplary method for advising the wireless cell that the channel change was successful.
Figure 66:
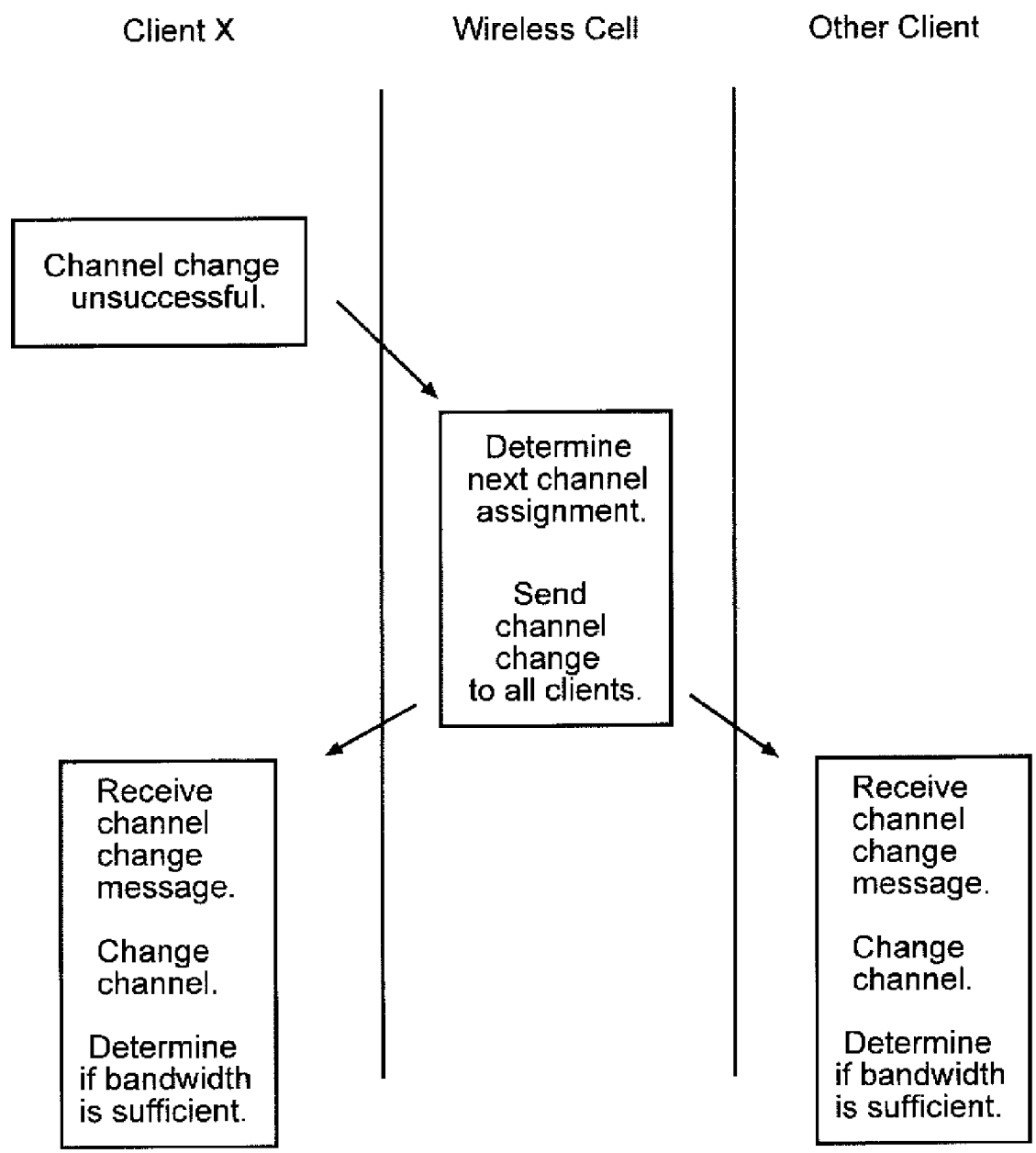
FIG. 66 is a flow chart of an exemplary method for advising the wireless cell that the new channel does not provide sufficient throughput.

After Client X switches to a new channel and the channel provides the desired throughput, as shown in FIG. 65, Client X sends a message to the Wireless Cell that the channel change was successful. The Wireless Cell terminates the throughput optimization process and sends a message to each client that the channel change sequence is done. If the new channel assigned to Client X does not provide the desired throughput, as shown in FIG. 66, Client X sends a channel change unsuccessful message to the Wireless Cell. When the Wireless Cell receives the message, it determines the next best channel assignment to enable Client X to receive the desired throughput. The Wireless Cell sends new channel assignments to all clients. Each client sets the new radio channel, and then determines if the new channel provides the necessary throughput.

Figure 67:
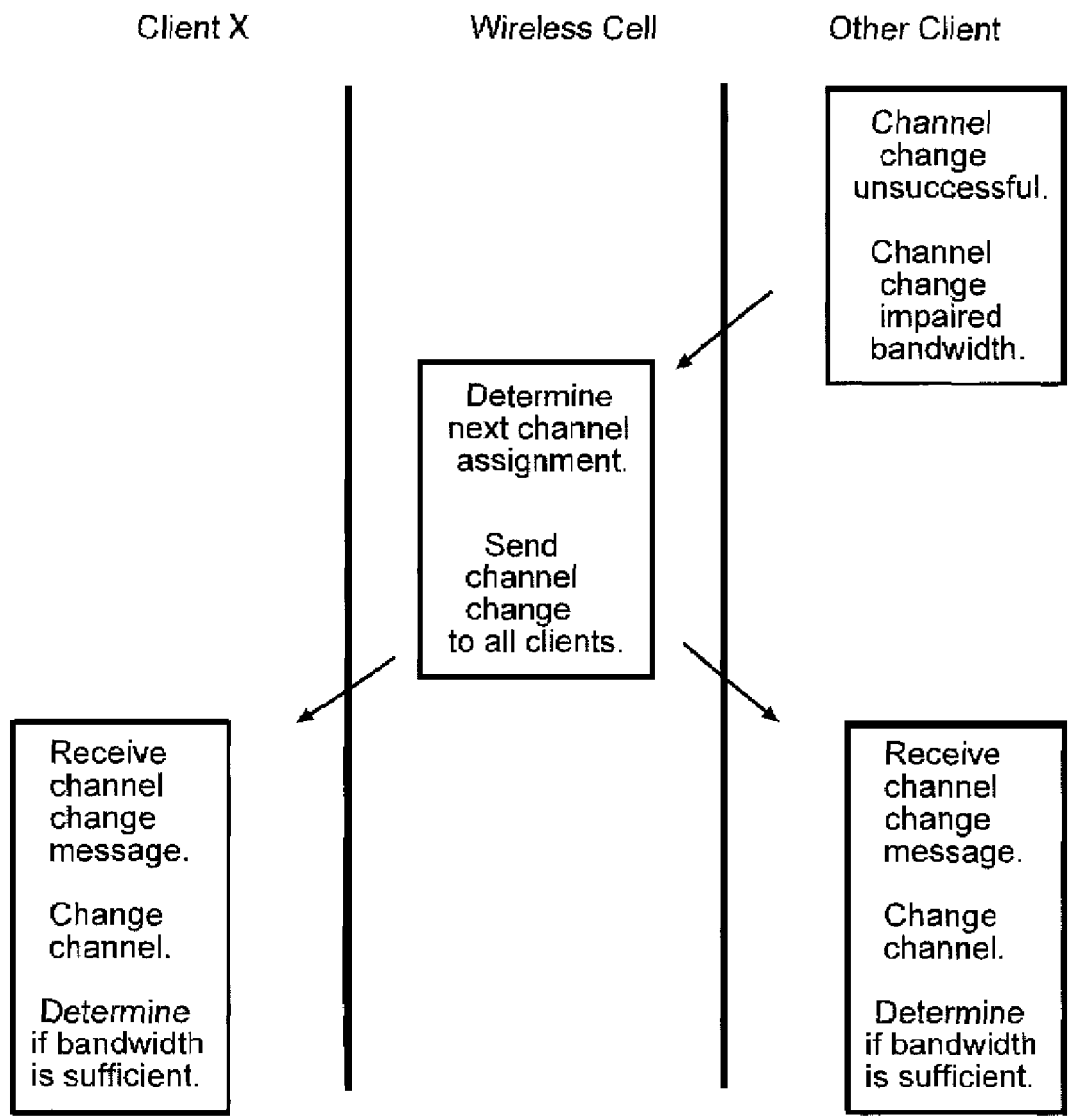
FIG. 67 is a flow chart of an exemplary method for advising the wireless cell that a channel change has impaired performance.
Figure 68:
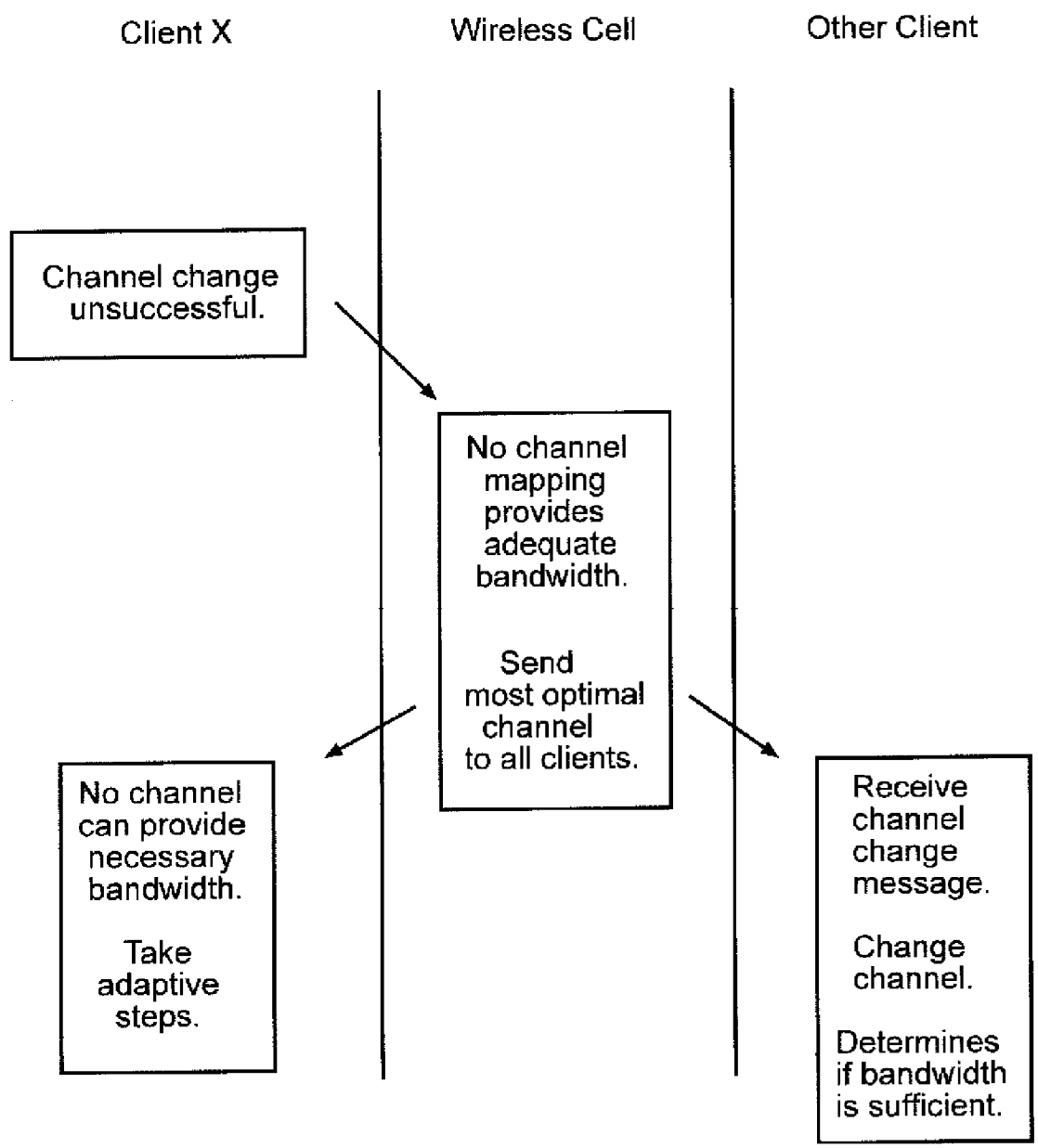
FIG. 68 is a flow chart of an exemplary method for the wireless cell to advise the client that no channel may provide sufficient throughput.

If the throughput of one of the Other Clients is impaired by the new channel assignment, as depicted in FIG. 67, the Other Client sends the channel change unsuccessful message to the Wireless Cell. The Wireless Cell determines the next best channel assignment and sends the new channel assignments to each client. Each client changes to the new channel, and then determines if the new channel provides the throughput necessary for proper operation. At some point, the channel assigned to Client X may still not deliver the throughput desired for proper operation, yet the Wireless Cell may have exhausted all or most available channel assignments. As shown in FIG. 68, when Client X communicates to the Wireless Cell that the new channel assignment is unsuccessful because it does not deliver the desired throughput, the Wireless Cell, in one embodiment, selects the best channel assignment available, sends the channel assignment to the clients, and informs each client that no channel may provide the necessary throughput. At that point, Client X may implement steps to resolve the problem. Some of the options for Client X may include, for example, at least one of transcoding to a lower bit rate, displaying a message to the user, prioritizing desired throughput for multiple clients, redistributing client load among available radios and/or antennas, or continuing to operate with degraded performance.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method performed by a first wireless cell for improving a throughput between the first wireless cell and a first wireless client, the method comprising:
   sending a first data to the first client using a first antenna of a plurality of antennas and a first channel of a plurality of channels;
   sending a second data to a second wireless client using a second antenna of the plurality of antennas and a second channel of the plurality of channels;
   receiving a first message from the first client that the first channel does not provide a sufficient throughput to the first client; and
   selecting a first different channel for communication with the first client, wherein:
      the first wireless cell comprises the plurality of antennas and the plurality of channels;
      the first client comprises the plurality of channels;
      the second client comprises the plurality of channels;
      the first antenna comprises a first physical sector having an angle of coverage less than about 270 degrees;
      the second antenna comprises a second physical sector having an angle of coverage less than about 270 degrees;
      the first physical sector overlaps at least 30 percent of the second physical sector thereby forming a virtual sector;
      the first channel and the second channel comprise different channels;
      the first client and the second client are positioned inside the virtual sector;
      the first wireless cell simultaneously communicates with the first client and the second client using the first antenna and the second antenna respectively.

2. The method of claim 1 wherein selecting further comprises:
   detecting the throughput between the first wireless cell and the first client for each channel of the plurality of channels; and
   selecting as the first different channel one channel of the plurality of channels that provides throughput greater than a threshold.

3. The method of claim 1 wherein selecting further comprises:
   determining that no channel delivers the sufficient throughput to the first client; and
   selecting a channel that provides a throughput greater than a threshold.

4. The method of claim 1 further comprising sending a third message to the first client and the second client
   to inform the first client and the second client that the a channel change is complete.

5. The method of claim 1 further comprising receiving a third message from the first client indicating that the first different channel provides the sufficient throughput to the first client.

6. The method of claim 1 further comprising:
   responsive to selecting, selecting a second different channel for communication with the second client; and
   sending a third message to the second client to inform the second client to change to the second different channel.

7. A method performed by a first wireless client for improving a throughput between a first wireless cell and the first client, the method comprising:
   receiving a first data from the first wireless cell using a first channel of a plurality of channels;
   detecting that the throughput of the first data is insufficient;
   sending a first message to the first wireless cell indicating that the throughput is insufficient; and
   receiving a second message from the first wireless cell to change to a different; channel wherein:
      the first wireless cell comprises a plurality of antennas and the plurality of channels;
      the first client comprises the plurality of channels;
      the second client comprises the plurality of channels;
      the first wireless cell communicates with the first client and the second client using a first antenna and a second antenna respectively of the plurality of antennas;
      the first antenna comprises a first physical sector having an angle of coverage less than about 270 degrees;
      the second antenna comprises a second physical sector having an angle of coverage less than about 270 degrees;
      the first physical sector overlaps at least 30 percent of the second physical sector thereby forming a virtual sector;
      the first channel and the second channel comprise different channels;
      the first client and the second client are positioned inside the virtual sector;
      the first wireless cell simultaneously communicates with the first client and the second client using the first antenna and the second antenna respectively.

8. The method of claim 7 further comprising receiving a third message from the first wireless cell indicating that a channel change is complete.

9. The method of claim 7 wherein detecting comprises detecting when the fullness decreases below a threshold.

10. The method of claim 7 further comprising changing to the different channel responsive to receiving the second message.

11. The method of claim 7 further comprising sending a third message to the first client indicating no channel provides the sufficient throughput.

12. The method of claim 7 further comprising detecting whether the throughput using the different channel is sufficient.

13. The method of claim 7 further comprising:
   detecting that the throughput using the different channel is sufficient; and
   sending a third message to the first wireless cell to inform the first wireless cell that the throughput is sufficient.

14. The method of claim 7 further comprising receiving a third message from the first wireless cell indicating no channel provides the sufficient throughput.

15. The method of claim 7 further comprising at least one of transcoding to a lower bit rate and displaying a message to the user respectively responsive to receiving the third message.

* * * * *